US008351764B2

(12) United States Patent
Kinoshita et al.

(10) Patent No.: US 8,351,764 B2
(45) Date of Patent: Jan. 8, 2013

(54) NETWORK SYSTEM, TERMINAL APPARATUS, RECORDING APPARATUS, METHOD OF DISPLAYING RECORD SCHEDULING STATE, COMPUTER PROGRAM FOR TERMINAL APPARATUS, COMPUTER PROGRAM FOR RECORDING APPARATUS

(75) Inventors: Akihiko Kinoshita, Tokyo (JP); Takashi Kanao, Tokyo (JP); Hiroyuki Chiba, Kanagawa (JP); Tsuyoshi Homma, Chiba (JP); Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 1173 days.

(21) Appl. No.: 11/957,831

(22) Filed: Dec. 17, 2007

(65) Prior Publication Data
US 2008/0170836 A1    Jul. 17, 2008

(30) Foreign Application Priority Data

Jan. 12, 2007    (JP) .................................. 2007-004935

(51) Int. Cl.
*H04N 5/91*    (2006.01)
(52) U.S. Cl. .................. 386/291; 386/297; 386/E5.002; 725/39; 709/219
(58) Field of Classification Search .................. 386/291, 386/297, E5.002; 725/39; 709/219
See application file for complete search history.

(56) References Cited

U.S. PATENT DOCUMENTS

| 7,971,219 | B2* | 6/2011 | Iino .................................. 725/58 |
| 2002/0038457 | A1* | 3/2002 | Numata et al. ................... 725/47 |
| 2002/0049620 | A1* | 4/2002 | Uchida et al. ..................... 705/5 |
| 2004/0003413 | A1* | 1/2004 | Boston et al. ................. 725/133 |
| 2005/0229211 | A1* | 10/2005 | Iino ................................. 725/58 |
| 2005/0229215 | A1* | 10/2005 | Schein et al. .................... 725/61 |
| 2005/0251825 | A1* | 11/2005 | Fukuda et al. ................... 725/44 |
| 2008/0022322 | A1* | 1/2008 | Grannan et al. ................. 725/78 |
| 2008/0288985 | A1* | 11/2008 | Verhaegh et al. ............... 725/58 |

(Continued)

FOREIGN PATENT DOCUMENTS
JP    2001-339696 A    12/2001
(Continued)

OTHER PUBLICATIONS

Japanese Office Action mailed Jan. 11, 2012, issued for JP Application No. 2007-004935, filed Jan. 12, 2007.

*Primary Examiner* — Kambiz Zand
*Assistant Examiner* — Tongoc Tran
(74) *Attorney, Agent, or Firm* — Oblon, Spivak, McClelland, Maier & Neustadt, L.L.P.

(57) ABSTRACT

A network system includes a terminal apparatus, a recording apparatus, and a network. The recording apparatus includes a record-scheduling-state storing section that stores data of a record scheduling state of a program and a record-scheduling-state providing section that transmits the data of the record scheduling state stored in the record-scheduling-state storing section through the network. The terminal apparatus includes a record-scheduling-state acquiring section that acquires the data of the record scheduling state of the recording apparatus through the network, an EPG data acquiring section that acquires EPG data, a record-scheduling-state-display processing section that creates, on the basis of the data of the record scheduling state acquired by the record-scheduling-state acquiring section and the EPG data acquired by the EPG data acquiring section, EPG display data that reflects the record scheduling state, and a display unit that displays the EPG display data created by the record-scheduling-state-display processing section.

12 Claims, 18 Drawing Sheets

U.S. PATENT DOCUMENTS

2009/0259730 A1 * 10/2009 Machida et al. .............. 709/219

FOREIGN PATENT DOCUMENTS

| | | | |
|---|---|---|---|
| JP | 2003-078851 A | 3/2003 |
| JP | 2003-092711 A | 3/2003 |
| JP | 2004-254165 A | 9/2004 |
| JP | 2006-270501 A | 10/2006 |
| JP | 2006-279225 A | 10/2006 |

* cited by examiner

○ RECORD SCHEDULED

♡ RECOMMEND PROGRAM LIST (SCHEDULING CANDIDATE)

♥ VERY RECOMMENDED PROGRAM LIST (SCHEDULING CANDIDATE)

FIG. 13

| CONTROLLED APPARATUS ID | CONTROLLED APPARATUS NAME | RECORD SCHEDULED/RECORD SCHEDULING CANDIDATE |
|---|---|---|
| 1 | RECORDING APPARATUS A | RECORD SCHEDULED PROGRAM: PROGRAM 1, 12<br>RECORD SCHEDULING CANDIDATE PROGRAM: PROGRAM 6 (RECOMMENDED), PROGRAM 4 (VERY RECOMMENDED) |
| 2 | RECORDING APPARATUS B | RECORD SCHEDULED PROGRAM: PROGRAM 5, 6<br>RECORD SCHEDULING CANDIDATE PROGRAM: PROGRAM2 (RECOMMENDED) |
| 3 | RECORDING APPARATUS C | RECORD SCHEDULED PROGRAM: PROGRAM 3, 12<br>RECORD SCHEDULING CANDIDATE PROGRAM: PROGRAM 10 (VERY RECOMMENDED) |

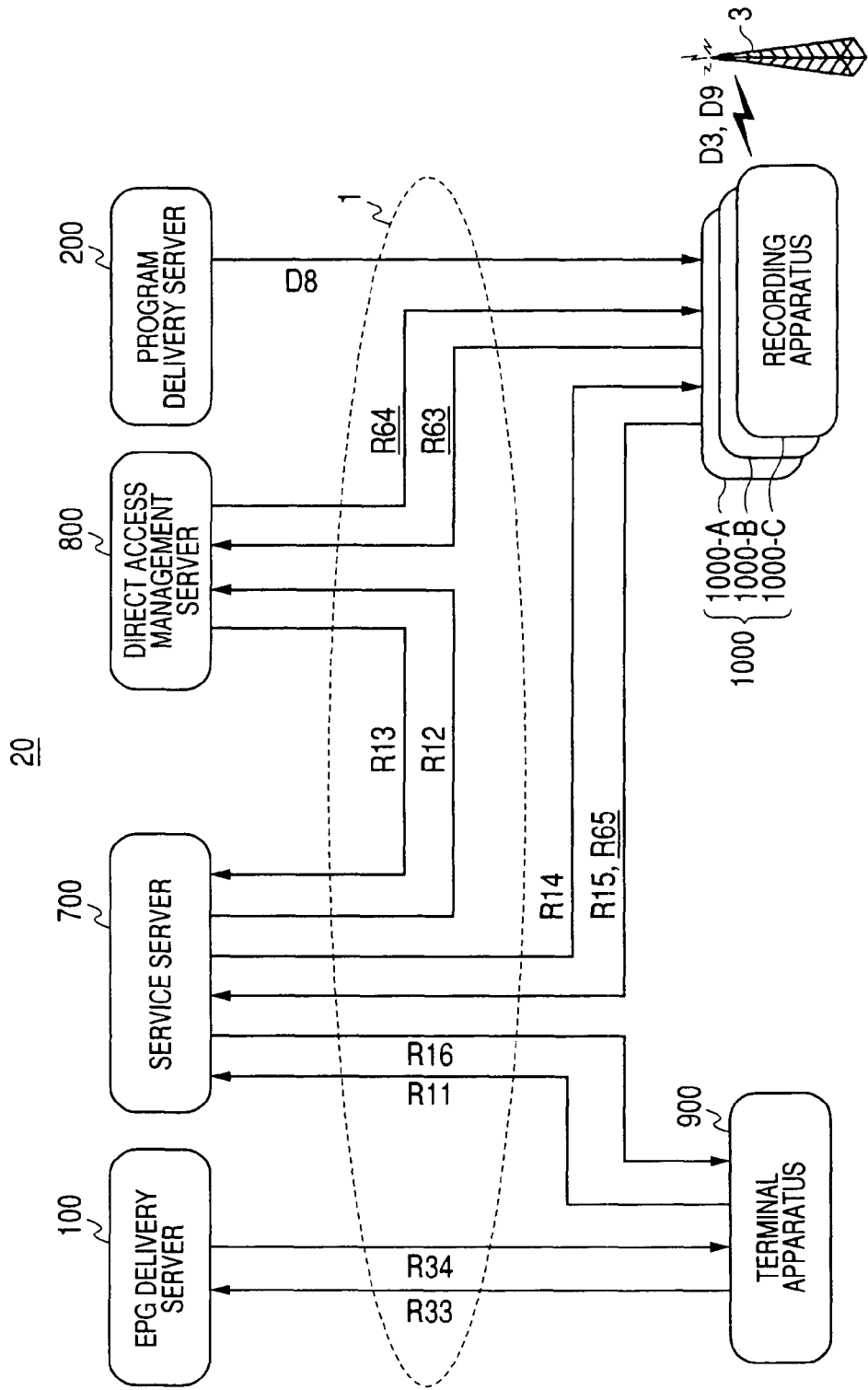

NETWORK SYSTEM, TERMINAL APPARATUS, RECORDING APPARATUS, METHOD OF DISPLAYING RECORD SCHEDULING STATE, COMPUTER PROGRAM FOR TERMINAL APPARATUS, COMPUTER PROGRAM FOR RECORDING APPARATUS

CROSS REFERENCES TO RELATED APPLICATIONS

The present invention contains subject matter related to Japanese Patent Application JP 2007-004935 filed in the Japanese Patent Office on Jan. 12, 2007, the entire contents of which being incorporated herein by reference.

BACKGROUND OF THE INVENTION

1. Field of the Invention

The present invention relates to a network system that is capable to transmitting a record scheduling state of a recording apparatus to a terminal apparatus using a network, a terminal apparatus, a recording apparatus, a method of displaying the record scheduling state, a computer program for the terminal apparatus, and a computer program for the recording apparatus.

2. Description of the Related Art

In recent years, services for providing data of electronic program guides (EPGs) are widely spread. The EPGs are program guides for, for example, broadcast programs such as programs of a terrestrial analog television broadcast, a terrestrial digital television broadcast, a CS digital broadcast, and a BS digital broadcast and so-called "network programs" that are programs provided from program delivery service sites on the Internet.

There is also known, as another service associated with the EPGs, a remote record scheduling service for performing scheduling for causing a recording apparatus connected to a network to record a program selected from an EPG displayed on a display of a terminal apparatus. A server that performs the remote record scheduling service receives a request for remote record scheduling from the terminal apparatus through the network. The server transmits record scheduling information such as a program ID, a channel name, a broadcast date, a broadcast start/end time, and a title of a program to be recorded to the recording apparatus, association of which with the terminal apparatus is set in advance. The recording apparatus receives and records a broadcast program on the basis of the record scheduling information received by the server (see, for example, JP-A-2001-309285).

SUMMARY OF THE INVENTION

In order to check, in the terminal apparatus, a state of record scheduling in the recording apparatus, for example, a system for transferring contents of a record scheduling list, which is stored in a storing unit of the recording apparatus, from the recording apparatus to the terminal apparatus through the network and displaying the record scheduling list in the terminal apparatus is conceivable. However, the record scheduling list is only an enumeration of information on a text basis such as a program ID, a channel name, a broadcast date, a broadcast start/end time, and a title, which are necessary for record scheduling for the program. It is difficult to instantaneously grasp a record scheduling state of the program simply by glancing through the record scheduling list.

When plural recording apparatuses usable by a user are connected to the network and the user desires to check, in the terminal apparatus, record scheduling states of the recording apparatuses, the user switches and displays record scheduling lists of the respective recording apparatuses in order and refers to the record scheduling lists. However, it is difficult to find a state in which the same program is record-scheduled in the plural recording apparatuses and it is also difficult to find that an omission of record scheduling occurs.

Therefore, it is desirable to provide a network system, a terminal apparatus, a recording apparatus, a method of displaying a record scheduling state, a computer program for the terminal apparatus, and a computer program for the recording apparatus that can efficiently check a record scheduling state of the recording apparatus on the terminal apparatus.

According to an embodiment of the present invention, there is provided a network system including a terminal apparatus, a recording apparatus, and a network. The recording apparatus includes a record-scheduling-state storing section that stores data of a record scheduling state of a program and a record-scheduling-state providing section that transmits the data of the record scheduling state stored in the record-scheduling-state storing section through the network. The terminal apparatus includes a record-scheduling-state acquiring section that acquires the data of the record scheduling state of the recording apparatus through the network, an EPG data acquiring section that acquires EPG data, a record-scheduling-state-display processing section that creates, on the basis of the data of the record scheduling state acquired by the record-scheduling-state acquiring section and the EPG data acquired by the EPG data acquiring section, EPG display data that reflects the record scheduling state, and a display unit that displays the EPG display data created by the record-scheduling-state-display processing section.

According to the embodiment, since the EPG data that reflects the record scheduling state of the recording apparatus is displayed in the terminal apparatus, it is possible to efficiently check, in the terminal apparatus, a record scheduling state of the recording apparatus compared with the system for displaying a record scheduling list on a text basis.

It is preferable that the record-scheduling-state-display processing section creates EPG display data that reflects the record scheduling state such that a record-scheduled program and a record-scheduling candidate program can be identified. The record scheduling candidate program is, for example, a program automatically retrieved in the recording apparatus as a program that suits a taste of a user. The record scheduling candidate program needs to be distinguished from the record-scheduled program. It is easy for the user to distinguish the record scheduling candidate program from the record-scheduled program by displaying the programs such that the programs can be identified.

It is preferable that the record-scheduling-state acquiring section acquires data of record scheduling states of plural recording apparatuses through the network and the record-scheduling-state-display processing section creates EPG display data that reflects the record scheduling state of each of the recording apparatuses selected by a user. Consequently, when there are plural recording apparatuses, correspondence between the recording apparatuses and the record scheduling states are clarified. Further, the user can unitarily check, in the terminal apparatus, the record scheduling states of the plural recording apparatuses.

It is preferable that the record-scheduling-state acquiring section acquires data of record scheduling states of plural recording apparatuses through the network and the record-scheduling-state-display processing section creates EPG display data in which the acquired record scheduling states of the plural recording apparatuses are united and reflected on EPG data. Consequently, the user can unitarily check, in the terminal apparatus, the record scheduling states of the plural recording apparatuses and can easily find that record scheduling of the same program is redundantly set in the plural recording apparatuses.

It is preferable that the record-scheduling-state acquiring section requests acquisition of the data of the record scheduling state through the network and acquires the data of the record scheduling state as a response to the request. Consequently, the user can actively acquire the data of the record scheduling state of the recording apparatus from the terminal apparatus and display an EPG that reflects the record scheduling state.

It is preferable that the terminal apparatus further includes a remote-record-scheduling processing section that transmits a record scheduling request for a program selected by a user on the EPG, which is displayed on the display unit and reflects the record scheduling state, through the network. Consequently, the user can select, for example, a record scheduling candidate program and set recording scheduling in the recording apparatus.

It is preferable that the remote-record-scheduling processing section transmits a cancellation request for the record scheduling of the program selected by the user on the EPG, which is displayed on the display unit and reflects the record scheduling state, through the network. Consequently, when the user finds on the EPG, which reflects the record scheduling state, that record scheduling of the same program is redundantly set in two recording apparatuses, the user can cancel the record scheduling in one recording apparatus by operating the terminal apparatus.

According to the embodiment, it is possible to efficiently check a record scheduling state of the recording apparatus on the terminal apparatus.

BRIEF DESCRIPTION OF THE DRAWINGS

FIG. 13 is a diagram showing an example of record scheduling state data;

FIG. 14 is a diagram showing the overall structure of a network system according to a second embodiment of the present invention;

DESCRIPTION OF THE PREFERRED EMBODIMENTS

Embodiments of the present invention will be hereinafter explained with reference to the accompanying drawings.

Figure 1:
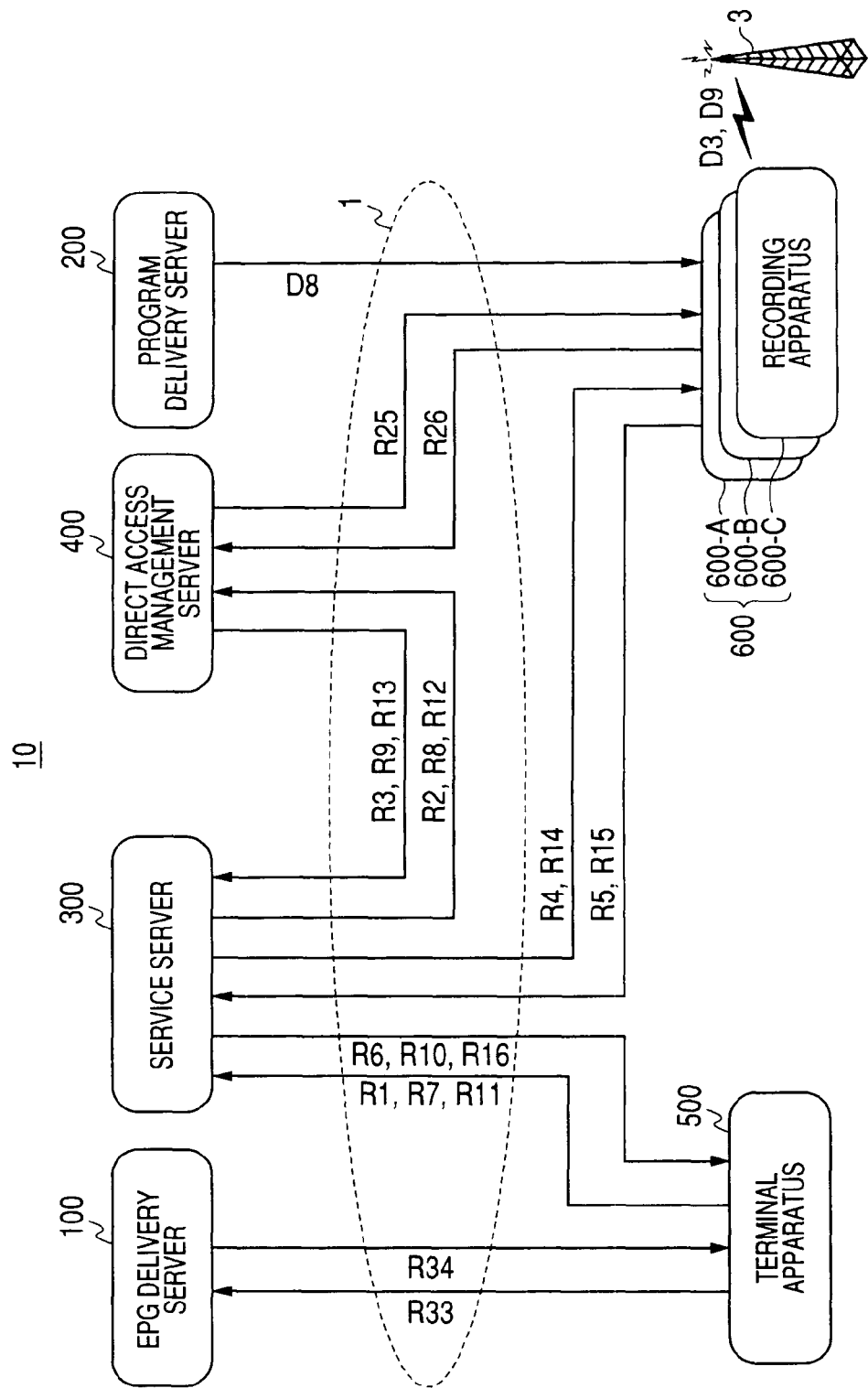
FIG. 1 is a diagram showing the overall structure of a network system according to an embodiment of the present invention.

FIG. 1 is a diagram showing the overall structure of a network system 10 according to a first embodiment of the present invention.

The network system 10 includes an EPG delivery server 100, a program delivery server 200, a service server 300, a direct access management server 400, a terminal apparatus 500, and recording apparatuses 600 (600-A, 600-B, and 600-C). These servers and apparatuses can be connected to be capable of communicating with one another through a network 1 such as the Internet. In this embodiment, the three recording apparatuses 600 are connected to the network 1. When the three recording apparatuses 600 are individually referred to, the recording apparatuses 600 are described as "recording apparatus 600-A", "recording apparatus 600-B", and "recording apparatus 600-C", respectively. Unless specifically designated, the recording apparatuses 600 are collectively described as "recording apparatus 600". When all the three recording apparatuses 600 are designated, the recording apparatuses 600 are described as "recording apparatuses 600 (600-A, 600-B, and 600-C)".

The program delivery server 200 is a server apparatus that delivers a broadcast program such as a program of an IP (Internet Protocol) multicast broadcast and a program D8 such as a VoD (Video on Demand) program through the network 1. Plural program delivery servers 200 may be connected to the network 1.

The EPG delivery server 100 is a server apparatus that stores data of an electronic program guide (EPG) in which information for guiding a user to view programs provided by the program delivery server 200 and a broadcasting station 3 and delivers, when an EPG acquisition request R33 from the terminal apparatus 500 or the recording apparatus 600 connected to the network 1 is received, the data of the EPG to the terminal apparatus 500 or the recording apparatus 600 through the network 1 as an EPG acquisition request R34.

The service server 300 isa server apparatus that performs, in response to a remote record scheduling request R11 from the terminal apparatus 500, a remote record scheduling service for causing the recording apparatus 600 to execute record scheduling of a program or cancel the record scheduling. The service server 300 is capable of performing, in response to a record scheduling state acquisition request R1 from the terminal apparatus 500, a service for causing the terminal apparatus 500 to acquire record scheduling states of the respective recording apparatuses 600 (600-A, 600-B, and 600-C) as a part of the remote record scheduling service.

The direct access management server 400 is a server apparatus that manages a correspondence relation between a combination of the terminal apparatus 500 and the remote record scheduling service by the service server 300 and the recording apparatus 600 and performs processing concerning, for example, exchange of information necessary for the service server 300 to directly access the recording apparatus 600 through the network 1.

The terminal apparatus 500 transmits the record scheduling state acquisition request R1 to the service server 300 through the network 1, receives the data of the record scheduling states of the respective recording apparatuses 600 (600-A, 600-B, and 600-C) from the service server 300 as a record scheduling state acquisition response R6 and stores the data, and creates display data obtained by reflecting the record scheduling states on the EPG acquired from the EPG delivery server 100 and displays the display data. The terminal apparatus 500 causes the user to select, on the EPG that reflects the record scheduling states, a program for which remote record scheduling is performed or the remote record scheduling is cancelled, and transmits the remote record scheduling request R11 to the service server 300 to perform the remote record scheduling or the record scheduling cancellation for the program.

The recording apparatus 600 is a recording apparatus that is capable of performing, for example, record scheduling of a broadcast program by manual operation of the user or the like and remote record scheduling from the terminal apparatus 500 through the service server 300. The recording apparatus 600 that can record and reproduce data D8 of a program delivered from the program delivery server 200 and data D9 of programs broadcasted every moment from respective broadcasting stations 3 such as programs of a terrestrial analog digital television broadcast, a terrestrial digital television broadcast, a CS digital broadcast, and a BS digital broadcast. The recording apparatus 600 manages a state of record scheduling of the recording apparatus 600 itself. When a record scheduling state acquisition request R4 is received from the terminal apparatus 500 through the service server 300, the recording apparatus 600 is capable of responding with a record scheduling state.

Figure 2:
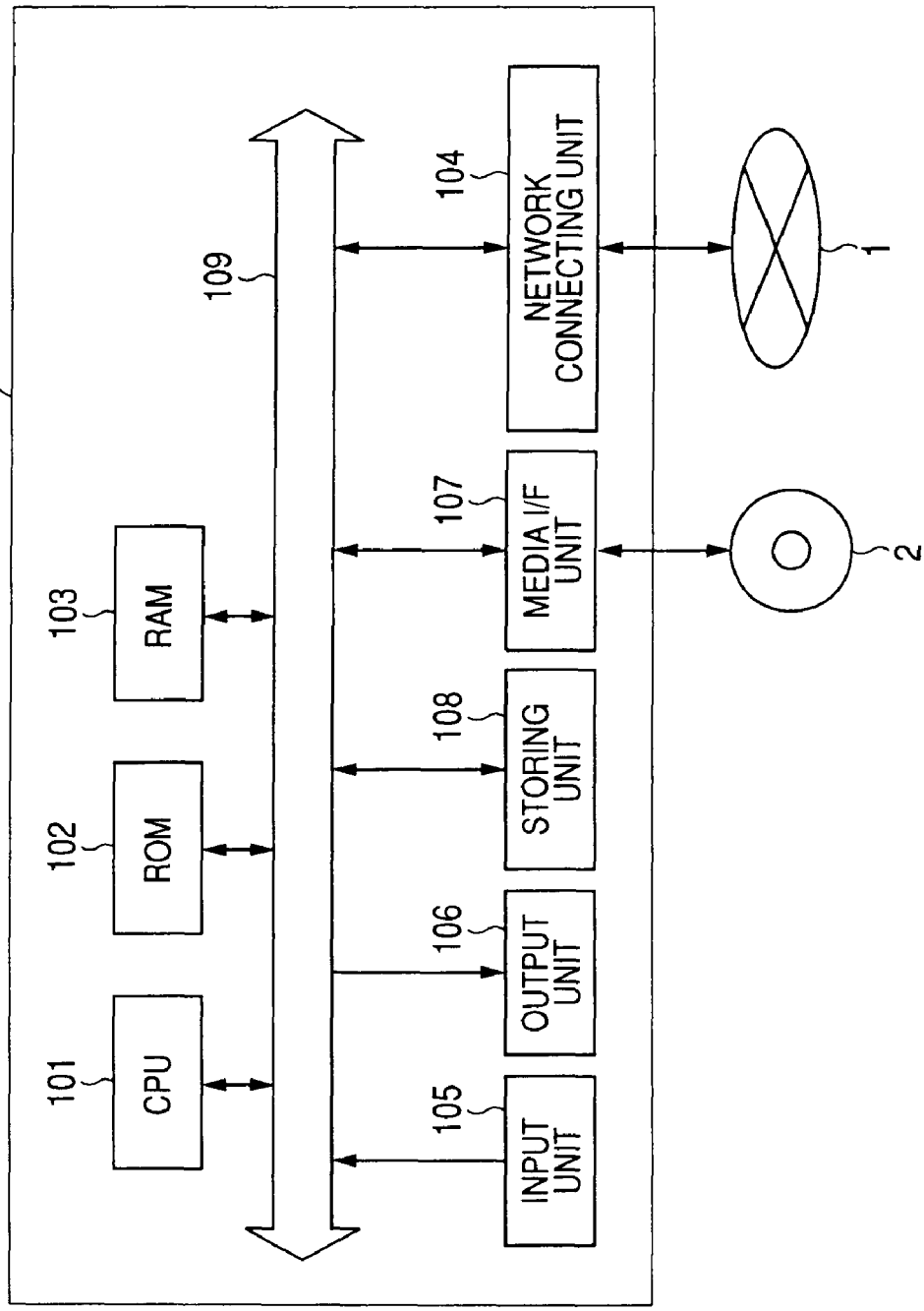
FIG. 2 is a block diagram showing a configuration of hardware of an EPG delivery server, a program delivery server, a service server, and a direct access management server shown in FIG. 1.

Each of the EPG delivery server 100, the program delivery server 200, the service server 300, and the direct access management server 400 is a typical computer system such as a personal computer as shown in, for example, FIG. 2.

In the computer system, a ROM (Read Only Memory) 102, a RAM (Random Access Memory) 103, a network connecting unit 104, an input unit 105 including a keyboard and a mouse, a display including a CRT (Cathode Ray Tube) or an LCD (Liquid Crystal Display), an output unit 106 including a speaker, a media interface unit 107, and a storing unit 108 including a hard disk or a nonvolatile memory are connected to a CPU (Central Processing Unit) 101 through a system bus 109.

The network connecting unit 104 is means for performing communication processing through the network 1. Programs for software processing, various data, and the like are stored in the storing unit 108. The CPU 101 loads the programs from the storing unit 108 to the RAM 103 and interprets and executes the programs in order to execute the software processing. A removable medium 2 such as a magnetic disk, an optical disk, a magneto-optical disk, or a semiconductor memory is inserted as appropriate. A program read out from the removable medium 2 is installed in the storing unit 108 when necessary.

A configuration of software of the service server 300 is explained with reference to FIG. 3. The service server 300 includes a service executing section 301 for executing a service concerning remote record scheduling. The service executing section 301 includes a remote-record-scheduling processing section 302 and a record-scheduling-stage-notification processing section 303.

The record-scheduling-state-notification processing section 303 receives the record scheduling state acquisition request R1 from the terminal apparatus 500. The record-scheduling-state-notification processing section 303 transmits a direct access start request R2 for requesting acquisition of a URI (Uniform Resource Identifier) for direct access, which is information necessary for the service server 300 to directly access the recording apparatus 600 associated with the combination of the terminal apparatus and the remote record scheduling service through the network 1, to the direct access management server 400. The record-scheduling-state-notification processing section 303 receives a direct access start response R3 including the URI for direct access from the direct access management server 400, accesses the respective recording apparatuses 600 (600-A, 600-B, and 600-C) on the basis of the direct access start response R3, and transmits the record scheduling state acquisition request R4 thereto. The record-scheduling-state-notification processing section 303 receives data of record scheduling states from the recording apparatus 600 as a record scheduling state acquisition request R5 and transmits the data to the terminal apparatus 500 as the record scheduling state acquisition request R6.

The remote-record-scheduling processing section 302 receives the remote record scheduling request R11 from the terminal apparatus 500. The remote-record-scheduling processing section 302 transmits a direct access start request R12 for requesting acquisition of a URI for direct access, which is information necessary for the service server 300 to directly access the recording apparatus 600 associated with the combination of the terminal apparatus 500 and the remote record scheduling service through the network 1, to the direct access management server 400. The remote-record-scheduling processing section 302 receives a direct access start response R13 including the URI for direct access from the direct access management server 400, accesses the recording apparatuses 600 (600-A, 600-B, and 600-C) on the basis of the direct access start response R13, and transmits a remote record scheduling command R14 thereto. The remote-record-scheduling processing section 302 receives a remote record scheduling result confirmation notice R15 indicating completion of the remote record scheduling from the recording apparatus 600 and transmits the remote record scheduling result confirmation notice R15 to the terminal apparatus 500 as a remote record scheduling result confirmation notice R16.

A configuration of software of the direct access management server 400 is explained with reference to FIG. 4. The direct access management server 400 includes a control apparatus and service/controlled apparatus management-ID storing section 411, a registration processing section 412, a direct-access-request processing section 413, and an XMPP (extensible Messaging and Presence Protocol) server 414.

In the control apparatus and service/controlled apparatus management-ID storing section 411, control apparatus and service management IDs, which are IDs given to combinations of the terminal apparatus 500 as a control apparatus and services of the service server 300, and a controlled apparatus management ID, which is an ID allocated to the recording apparatus 600 as a controlled apparatus, are tied to each other and stored.

The registration processing section 412 performs the registration of the control apparatus and service management IDs and the controlled apparatus management ID in the control apparatus and service/controlled apparatus management-ID storing section 411 and the tying of both the IDs. The registration processing section 412 creates, for example, according to a control apparatus and service registration request R21 from the service server 300, control apparatus and service management IDs for the combinations of the terminal apparatus 500 and the services provided by the service server 300 and registers the control apparatus and service management IDs in the control apparatus and service/controlled apparatus management-ID storing section 411. In this embodiment, since the service server 300 provides at least the remote record scheduling service, a control apparatus and service management ID indicating the combination of the terminal apparatus 500 and the remote record scheduling service is created.

The registration processing section 412 creates, according to controlled apparatus registration requests R23 from the respective recording apparatuses 600 (600-A, 600-B, and 600-C), separate controlled apparatus management IDs for the recording apparatuses 600 (600-A, 600-B, and 600-C) and stores the controlled apparatus management IDs in the control apparatus and service/controlled apparatus management-ID storing section 411 in association with the control apparatus and service management IDs. The registration processing section 412 stores the created controlled apparatus management IDs, a controlled apparatus ID for a service server, which is an ID for the service server 300 to identify the recording apparatus 600, a controlled apparatus ID for a recording apparatus, which is an ID for the recording apparatus 600 to identify the recording apparatus 600 itself, and controlled apparatus names created for the respective controlled apparatuses in the control apparatus and service/controlled apparatus management-ID storing section 411 in association with one another. As a method of determining with which of the control apparatus and service management IDs the controlled apparatus management IDs are associated, there are, for example, a method of using a password for controlled apparatus registration explained below.

In the method of using the password, after the control apparatus and service management IDs are registered in the direct access management server 400, the service server 300 requests the direct access management server 400 to issue a password for controlled apparatus registration. When this request is received, the direct access management server 400 creates a password for controlled apparatus registration, stores the password for controlled apparatus registration in association with the control apparatus and service management IDs, and transmits the password for controlled apparatus registration to the service server 300. The service server 300 transmits the password for controlled apparatus registration to the terminal apparatus 500. The terminal apparatus 500 transfers the acquired password for controlled apparatus registration to the recording apparatus 600 using an optical communication unit 511 (see FIG. 5). The recording apparatus 600 adds the password for controlled apparatus registration to the controlled apparatus registration request R23 and transmits the controlled apparatus registration request R23 to the direct access management server 400. The direct access management server 400 receives the controlled apparatus registration request R23. The direct access management server 400 creates a controlled apparatus management ID and compares the password for control apparatus registration included in the controlled apparatus registration request R23 and the password for controlled apparatus registration stored in association with the control apparatus and service management IDs. When the passwords for controlled apparatus registration match, the direct access management server 400 stores the control apparatus and service management ID associated with the matched password for controlled apparatus registration in the control apparatus and service/controlled apparatus management-ID storing section 411 in association with the created controlled apparatus management ID.

The direct-access-request processing section 413 receives the direct access start request R2 or R12 including the control apparatus service management ID from the service server 300. The direct-access-request processing section 413 refers to the control apparatus and service management ID included in the direct access start request R2 or R12 and the tied contents of the control apparatus and service management IDs and the controlled apparatus management IDs stored in the control apparatus and service/controlled apparatus management-ID storing section 411 and determines the controlled apparatus management ID tied to the control apparatus and service management ID included in the direct access start request R2 or R12. The direct-access-request processing section 413 transmits a direct access information acquisition request R25 for requesting acquisition of a URI for direct access, which is information necessary for the service server 300 to directly access the recording apparatus 600 through the network 1, to the recording apparatus 600 corresponding to the controlled apparatus management ID through the network 1. The direct-access-request processing section 413 receives a direct access information acquisition response R26 including the URI for direct access from the recording apparatus 600 and transmits the direct access start response R3 or R13 including the URI for direct access to the service server 300.

The URI for direct access includes a global IP address and a port number mapped to a local IP address and a port number of the recording apparatus 600 in a router, for example, when the recording apparatus 600 is connected to the network 1 through the router. However, when the recording apparatus 600 is directly connected to the network 1, the URI for direct access may be a global IP address allocated to the recording apparatus 600.

In the direct access management server 400, the XMPP server 414 for setting a bidirectional fulltime connection session with the recording apparatus 600 is provided. XMPP is a protocol for realizing real time communication. The recording apparatus 600 sets the fulltime connection session by logging in the XMPP server 414 before the terminal apparatus 500 accesses the recording apparatus 600 through the network 1. The direct access management server 400 receives the direct access start request R2 or R12 from the service server 300, for which an XMPP session is established with the XMPP server 414. The direct access management server 400 transmits the direct access information acquisition request R25 to the recording apparatus 600 through the fulltime connection session established between the XMPP server 414 and the recording apparatus 600.

Figure 5:
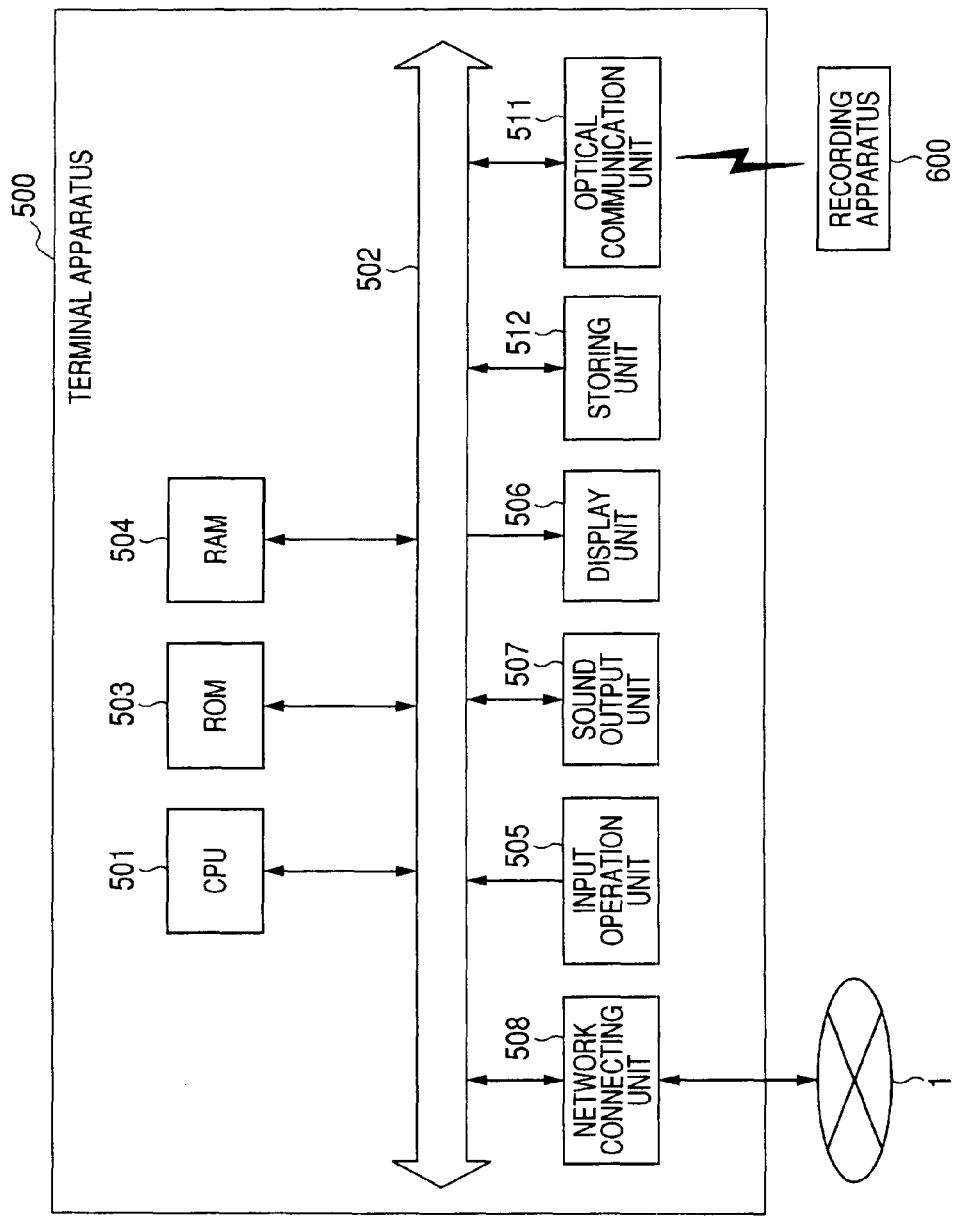
FIG. 5 is a block diagram showing a configuration of hardware of a terminal apparatus.

The terminal apparatus 500 is explained. FIG. 5 is a block diagram showing a configuration of hardware of the terminal apparatus 500. As shown in the figure, a ROM 503, a RAM 504, an input operation unit 505, a display unit 506, a sound output unit 507, a network connecting unit 508, an optical communication unit 511, and a storing unit 512 are connected to a CPU 501 through a system bus 502.

The input operation unit 505 includes various keys and the like and processes input of various commands and data from the user. A command inputted by the user using the input operation unit 505 is supplied to the CPU 501 by a not-shown input interface unit through the system bus 502. The display unit 506 includes a display such as an LCD and a display control circuit that drives the display. The display unit 506 displays, for example, data of an EPG acquired from the EPG delivery server 100. The sound output unit 507 includes a circuit that converts a digital sound signal to an analog sound signal and a speaker. The network connecting unit 508 processes connection to the network 1 by wire or radio.

The optical communication unit 511 is an interface for processing communication between the terminal apparatus 500 and an external apparatus such as the recording apparatus 600. Specifically, the optical communication unit 511 performs communication with the external apparatus using light such as an infrared ray as a wireless medium. Besides the light, other wireless media such as a radio wave, a sound wave, and an electromagnetic wave may be used. Besides the optical communication, the communication with the recording apparatus 600 may be performed through the network 1. Data of an EPG, data of record scheduling states of the respective recording apparatuses 600, and the like are stored in the storing unit 512.

The ROM 503 is a read-only memory in which programs and the like for software processing, which the terminal apparatus 500 should execute, are permanently stored. The programs may be stored in the storing unit 512. The RAM 504 is a writable volatile memory used for loading a program code executed by the CPU 501 and writing work data of the programs. The CPU 501 collectively performs control of the units described above and controls exchange of data among the units. The CPU 501 loads the programs from the storing unit 512 or the ROM 503 to the RAM 504 and interprets and executes the programs in order to execute the software processing, which the terminal apparatus 500 should execute.

A configuration of software of the terminal apparatus 500 is explained with reference to FIG. 6.

As shown in the figure, the terminal apparatus 500 includes an EPG data acquiring section 521, an EPG data storing section 522, a record-scheduling-state acquiring section 524, a record-scheduling-state storing section 525, a record-scheduling-state-display processing section 526, and a remote-record-scheduling processing section 527. The EPG data storing section 522 and the record-scheduling-state storing section 525 are set in the storing unit 512 or the RAM 504.

The record-scheduling-state acquiring section 524 transmits, with input of a record scheduling state acquisition instruction R31 inputted by the user using the input operation unit 505 as an opportunity, the record scheduling state acquisition request R1 to the service server 300 through the network 1, acquires data D11 of record scheduling states of the respective recording apparatuses 600 (600-A, 600-B, and 600-C) transmitted from the service server 300 as a record scheduling state acquisition response R6, and stores the data D11 in the record-scheduling-state storing section 525.

The EPG data acquiring section 521 transits, with an EPG data acquisition request R32 inputted by the user using the input operation unit 505 as an opportunity, an EPG acquisition request R33 to the EPG delivery server 100 through the network 1, acquires EPG data delivered from the EPG deliver server 100 as an EPG acquisition response R34, and writes the EPG data in the EPG data storing section 522. When the acquisition of the EPG data is completed, the EPG data acquiring section 521 outputs an EPG data acquisition completion notice R35 to the record-scheduling-state-display processing section 526.

The record-scheduling-state-display processing section 526 receives the EPG data acquisition completion notice R35 from the EPG-data acquiring section 521. The record-scheduling-state-display processing section 526 performs processing for creating, on the basis of the EPG data stored in the EPG data storing section 522 and the data D11 of the record scheduling states of the respective recording apparatuses 600 (600-A, 600-B, and 600-C) stored in the record-scheduling-state storing section 525, EPG display data D1 that reflects the record scheduling states of the recording apparatuses 600 (600-A, 600-B, and 600-C) and displaying the EPG display data D1 on the display unit 506. Types of record scheduling states of programs reflected on an EPG include "record scheduled" and "record scheduling candidate". The record-scheduling-state-display processing section 526 identifiably displays the respective record scheduling states using unique marks and the like such that the states can be identified at a glance. A program of the record schedule candidate is a program that is determined as matching a taste of the user by the recording apparatus 600 and is not record-scheduled yet.

A program desired to be remote-record-scheduled and the recording apparatus 600 at a record scheduling destination are selected out of programs of record schedule candidates in the EPG, which reflects the record scheduling states, displayed on the display unit 506 and a remote scheduling instruction R36 is inputted by the user using the input operation unit 505. The record-scheduling-state-display processing section 526 extracts record scheduling information D2, which is information necessary for remote record scheduling of the selected program, from the EPG data stored in the EPG data storing section 522 and outputs a remote record scheduling issue command R37 including the record scheduling information D2 to the remote-record-scheduling processing section 527.

The remote-record-scheduling processing section 527 receives the remote record scheduling issue command R37 from the record-scheduling-state-display processing section 526. The remote-record-scheduling processing section 527 transmits the remote record scheduling request R11 including the record scheduling information D2 and identification information of the recording apparatus 600 at the remote record scheduling destination to the service server 300 through the network 1, receives the remote record scheduling result notice R16 from the program delivery server 200, and displays the remote record scheduling result notice R16 on the display unit 506.

As the terminal apparatus 500 in this embodiment, a portable terminal such as a cellular phone or a PDA (Personal Digital Assistant), a personal computer, and the like are assumed. However, the terminal apparatus 500 of the present invention is not limited to these apparatuses. The terminal apparatus 500 may be an apparatus of any form as long as the apparatus has the components shown in FIGS. 5 and 6.

The recording apparatus 600 is explained. The recording apparatus 600 is an apparatus that can record and reproduce broadcast programs delivered from the program delivery server 200 through the network 1 and broadcast programs broadcasted every moment from the respective broadcasting stations 3 such as programs of a terrestrial analog television broadcast, a terrestrial digital television broadcast, a CS digital broadcast, and a BS digital broadcast.

Figure 7:
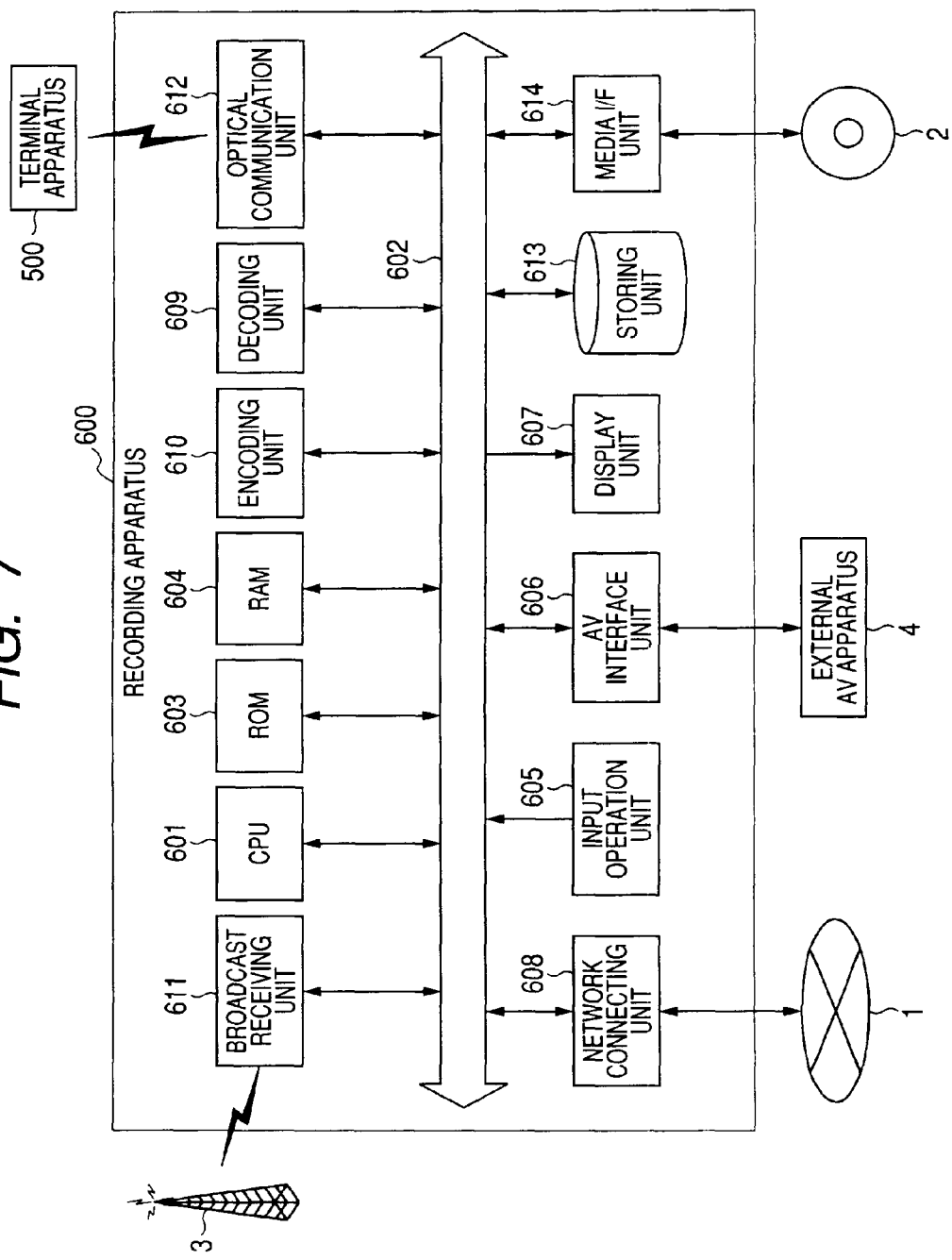
FIG. 7 is a block diagram showing a configuration of hardware of a recording apparatus.

FIG. 7 is a diagram showing a configuration of hardware of the recording apparatus 600.

As shown in the figure, a ROM 603, a RAM 604, an input operation unit 605, an AV interface unit 606, a display unit 607, a network connecting unit 608, a decoding unit 609, an encoding unit 610, a broadcast receiving unit 611, an optical communication unit 612, a storing unit 613 including a hard disk (HD), and a media interface unit 614 are connected to a CPU 601 through a system bus 602.

The input operation unit 605 includes various keys and the like and processes input of various commands for recording and reproduction from the user. The various commands inputted from the input operation unit 605 are supplied to the CPU 601 by a not-shown interface unit through the system bus 602. The display unit 607 includes a display such as an LCD and a display control circuit that drives the display and displays, for example, confirmation of commands and data inputted by the user and various statuses. The AV interface unit 606 processes input and output of video signals and audio signals to and from an external AV apparatus 4 such as a television connected to the recording apparatus 600.

The broadcast receiving unit 611 receives broadcast waves delivered from the respective broadcasting stations 3 such as broadcast waves of broadcast programs of a terrestrial analog television broadcast, a terrestrial digital television broadcast, a CS digital broadcast, a BS digital broadcast, and a terrestrial digital television broadcast for portable apparatuses and demodulates video signals and audio signals.

The encoding unit 610 encodes the video signals and the audio signals of the broadcast programs outputted by the broadcast receiving unit 611 in, for example, the MPEG2 (Moving Picture Experts Group 2) system. The network connecting unit 608 processes connection with the network 1.

The decoding unit 609 decodes program data acquired from the program delivery server 200 through the network 1 and encode data read out from the storing unit 512 and restores digital video data and audio data. The restored digital video data is supplied to the AV interface unit 606 through the system bus 602 and outputted to the external AV apparatus 4 such as a television connected to the AV interface unit 606.

The optical communication unit 612 is an interface for processing communication with an external apparatus such as the terminal apparatus 500. Specifically, the optical communication unit 612 performs communication with the external apparatus using light such as an infrared ray as a wireless medium. Besides the light, other wireless media such as a radio wave, a sound wave, and an electromagnetic wave may be used. Besides the optical communication, the communication with the terminal apparatus 500 may be performed through the network 1.

The storing unit 613 is a storing unit including a hard disk. Data of a program delivered from the program delivery server 200 through the network 1, data of a broadcast program encoded by the encoding unit 610, and the like are recorded in the storing unit 613.

The removable medium 2 such as an optical disk can be inserted in the media interface unit 614. Data of a broadcast program itself and the like can be recorded in the removable medium 2. As the removable medium 2, there are a DVD (Digital Versatile Disc)-recordable, a DVD-rewritable, a Blu-ray disk, and the like.

Programs and the like for software processing that the recording apparatus 600 should execute are stored in the ROM 603. The CPU 601 loads necessary programs from the ROM 603 to the RAM 604 and interprets and executes the programs in order to execute the software processing that the recording apparatus 600 should execute.

A configuration of software of the recording apparatus 600 is explained with reference to FIG. 8.

As shown in the figure, the recording apparatus 600 includes an EPG data acquiring section 621, an EPG data storing section 622, an EPG display processing section 623, a record-scheduling processing section 624, a recommended-program-list processing section 625, a record-scheduling-state storing section 626, a recommended-program-list-display processing section 632, a remote-record-scheduling processing section 627, a program-data acquiring section 628, a program-data storing section 629, a record-scheduling-state providing section 630, and a direct-access-information providing section 631. The EPG data storing section 622, the record-scheduling-state storing section 626, and the program-data storing section 629 are set in the removable medium 2 inserted in the storing unit 613 or the media interface unit 614.

The EPG data acquiring section 621 acquires, periodically or with an EPG acquisition instruction R41 inputted by the user using the input operation unit 605 as an opportunity, EPG data D3 transmitted with broadcast waves from the broadcasting stations 3 and writes the EPG data D3 in the EPG data storing section 622. The EPG data acquiring section 621 may acquire EPG data from the EPG delivery server 100 through the network 1 and write the EPG data in the EPG data storing section 622.

The EPG display processing section 623 performs processing for reading the EPG data D3 stored in the EPG data storing section 622, creating EPG display data D4, and causing the external AV apparatus 4 to display the EPG display data D4 through the AV interface unit 606.

The recommended-program-list-display processing section 625 automatically retrieves, on the basis of keys such as genres, titles, and performers of programs record-scheduled by the user in the past, a program that the user would be fond of from the EPG data D3 stored in the EPG data storing section 622 and registers the program as record scheduling candidate information D10 in a recommended program list stored in the record-scheduling-state storing section 626.

The user inputs a recommended program list display instruction R44 using the input operation unit 605. The recommended-program-list-display processing section 632 performs processing for creating display data D5 for the recommended program list stored in record-scheduling-state storing section 626 and causing the external AV apparatus 4 to display the display data D5 through the AV interface unit 606.

The user selects a program to be record-scheduled and inputs record scheduling instruction R45 for the program using the input operation unit 605 on the EPG or the recommended program list displayed on the external AV apparatus 4. The record-scheduling processing section 624 extracts record scheduling information D6, which is information necessary for the record scheduling of the program, from the EPG data stored in the EPG data storing section 622 and registers the record scheduling information D6 in the record scheduling list stored in the record-scheduling-state storing section 626.

The remote-record-scheduling processing section 627 receives the remote record scheduling command R14 transmitted from the service server 300 through the network 1. The remote-record-scheduling processing section 627 registers the record scheduling information D2 included in the remote record scheduling command R14 in the record scheduling list stored in the record-scheduling-state storing section 626. After the registration of the record scheduling information D2 is completed, the remote-record-scheduling processing section 627 transmits a remote record scheduling result notice R15 indicating the completion of the remote record scheduling to the service server 300 through the network 1.

The program-data acquiring section 628 selectively receives, on the basis of the record scheduling information registered in the record scheduling list stored in the record-scheduling-state storing section 626, the data D8 of the programs delivered from the program delivery server 200, the data D9 of the programs broadcasted from the broadcasting stations 3, and the like and records the data D8, the data D9, and the like in the program-data storing section 629.

The record-scheduling-state providing section 630 receives the record scheduling state acquisition request R4 transmitted from the service server 300 through the network 1. The record-scheduling-state providing section 630 transmits the record scheduling state acquisition response R5 including the data D11 of the record scheduling states, which are contents of the record scheduling list and the recommended program list stored in the record-scheduling-state storing section 626, to the service server 300 through the network 1.

The direct-access-information providing section 631 performs processing for logging in the XMPP server 414 of the direct access management server 400 and setting a bidirectional fulltime connection session with the direct access management server 400. The direct-access-information providing section 631 receives the direct access information acquisition request R25 from the direct access management server 400 through the fulltime connection session. The direct-access-information providing section 631 creates a URI for direct access including a global IP address and a port number mapped to the local IP address and the port number of the recording apparatus 600 in the router for connecting the recording apparatus 600 to the network 1 and transmits the direct access information acquisition response R26 including the URI for direct access to the direct access management server 400.

Operations in the first embodiment are explained.

First, as operations of the recording apparatus 600, operations concerning registration of record scheduling in the record scheduling list stored in the record-scheduling-state storing section 626 and registration of record scheduling candidates in the recommended program list stored in the record-scheduling-state storing section 626 are mainly explained.

Figure 8:
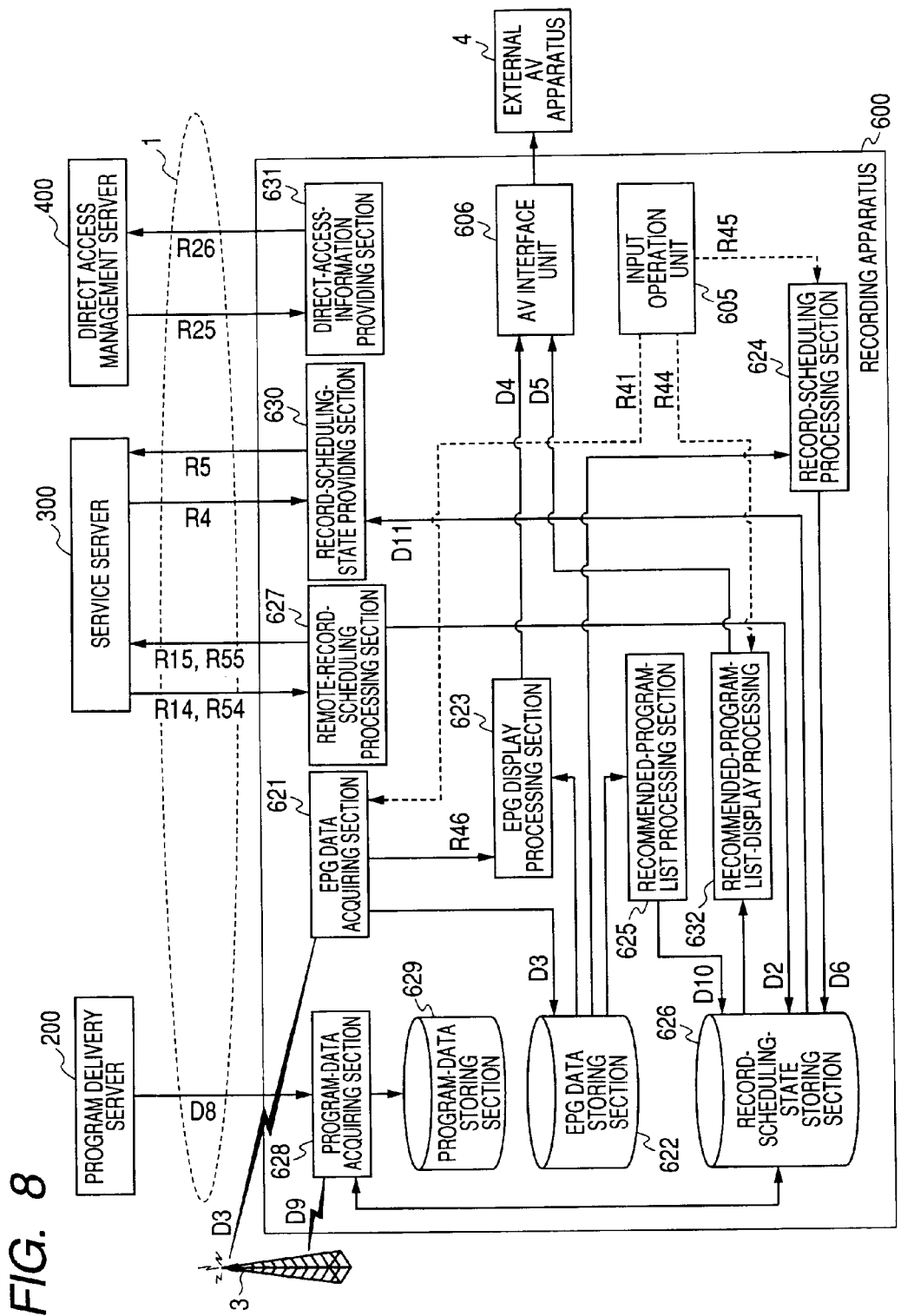
FIG. 8 is a block diagram showing a configuration of software of the recording apparatus.

In FIG. 8, first, the user gives the EPG acquisition instruction R41 to the EPG data acquiring section 621 using the input operation unit 605 in order to select a record scheduling object program on the basis of the EPG. The EPG data acquiring section 621 receives the EPG acquisition instruction R41. The EPG data acquiring section 621 transmits an EPG acquisition request R42 to the EPG delivery server 100 through the network 1, acquires the EPG data D3 delivered from the EPG deliver server 100 as an EPG acquisition response R43, and writes the EPG data D3 in the EPG data storing section 622. After completion of the writing of the EPG data D3, the EPG data acquiring section 621 outputs an EPG data display request R46 to the EPG display processing section 623.

The EPG display processing section 623 receives the EPG data display request R46 from the EPG data acquiring section 621. The EPG display processing section 623 reads the EPG data D3 from the EPG data storing section 622, creates EPG display data D4, and causes the external AV apparatus 4 to display the EPG display data D4 through the AV interface unit 606.

The user selects a program to be record-scheduled and performs operation for the record scheduling of the program by inputting the record scheduling instruction R45 for the program using the input operation unit 605, for example, on the EPG displayed on the external AV apparatus 4. The record-scheduling processing section 624 extracts the record scheduling information D6, which is information necessary for the record scheduling of the program, from the EPG data stored in the EPG data storing section 622 and registers the record scheduling information D6 in the record scheduling list in the record-scheduling-state storing section 626.

The record scheduling of a program performed by using the EPG is explained above. However, it is also possible to manually input information necessary for the record scheduling of the program and register the information in the record scheduling list using the input operation unit 605.

In the recording apparatus 600, the recommended-list processing section 625 automatically registers information concerning a program that the user would be fond of in the recommended program list stored in the record-scheduling-state storing section 626 as record scheduling candidate information D10, for example, as described below. The recommended-program-list processing section 625 manages keys of genres, titles, performers, and the like of programs that the user record-scheduled in the past. Every time new EPG data is acquired and stored in the EPG data storing section 622 by the EPG data acquiring section 621, the recommended-program-list processing section 625 retrieves a program including the keys in the new EPG data and registers information concerning the program in the recommended program list as the record scheduling candidate information D10. Moreover, in this embodiment, record scheduling candidate programs are further classified into "recommended programs" and "more recommended programs", which are programs with a higher degree of recommendation among the recommended programs, on the basis of the numbers of hits of the keys and are managed in separate recommended program lists.

The user inputs the recommended program list display instruction R44 using the input operation unit 605. The recommended-program-list-display processing section 632 creates display data D5 for the recommended program list stored in the record-scheduling-state storing section 626, outputs the display data D5 to the external AV apparatus 4 through the AV interface unit 606, and displays the display data D5 on the AV apparatus 4.

The user selects a program to be record-scheduled and inputs the record scheduling instruction R45 for the program using the input operation unit 605 on the recommended program list displayed on the external AV apparatus 4. The record-scheduling processing section 624 extracts the record scheduling information D6, which is information necessary for the record-scheduling of the program, from the EPG data stored in the EPG data storing section 622 and registers the record scheduling information D6 in the record scheduling list stored in the record-scheduling-state storing section 626.

On the basis of the record scheduling information D5 and D6 registered in the record scheduling list in the record-scheduling-state storing section 626 in this way, the program-data acquiring section 628 selectively receives programs such as the broadcast program D8 delivered by the program delivery server 200 and the broadcast program D9 from the broadcasting stations 3 and records the programs in the program-data storing section 629.

An operation for checking, in the terminal apparatus 500, record scheduling states of the respective recording apparatuses 600 (600-A, 600-B, and 600-C) tied to the terminal apparatus 500 is explained.

It is assumed that, in the direct access management server 400, tying of the control apparatus and service management IDs and the controlled apparatus management IDs has already been completed. It is assumed that, in the recording apparatus 600, as described above, registration of record scheduling in the record scheduling list stored in the record-scheduling-state storing section 626 and registration of record scheduling candidates in the recommended program list stored in the record-scheduling-state storing section 626 have already been performed.

Figure 6:
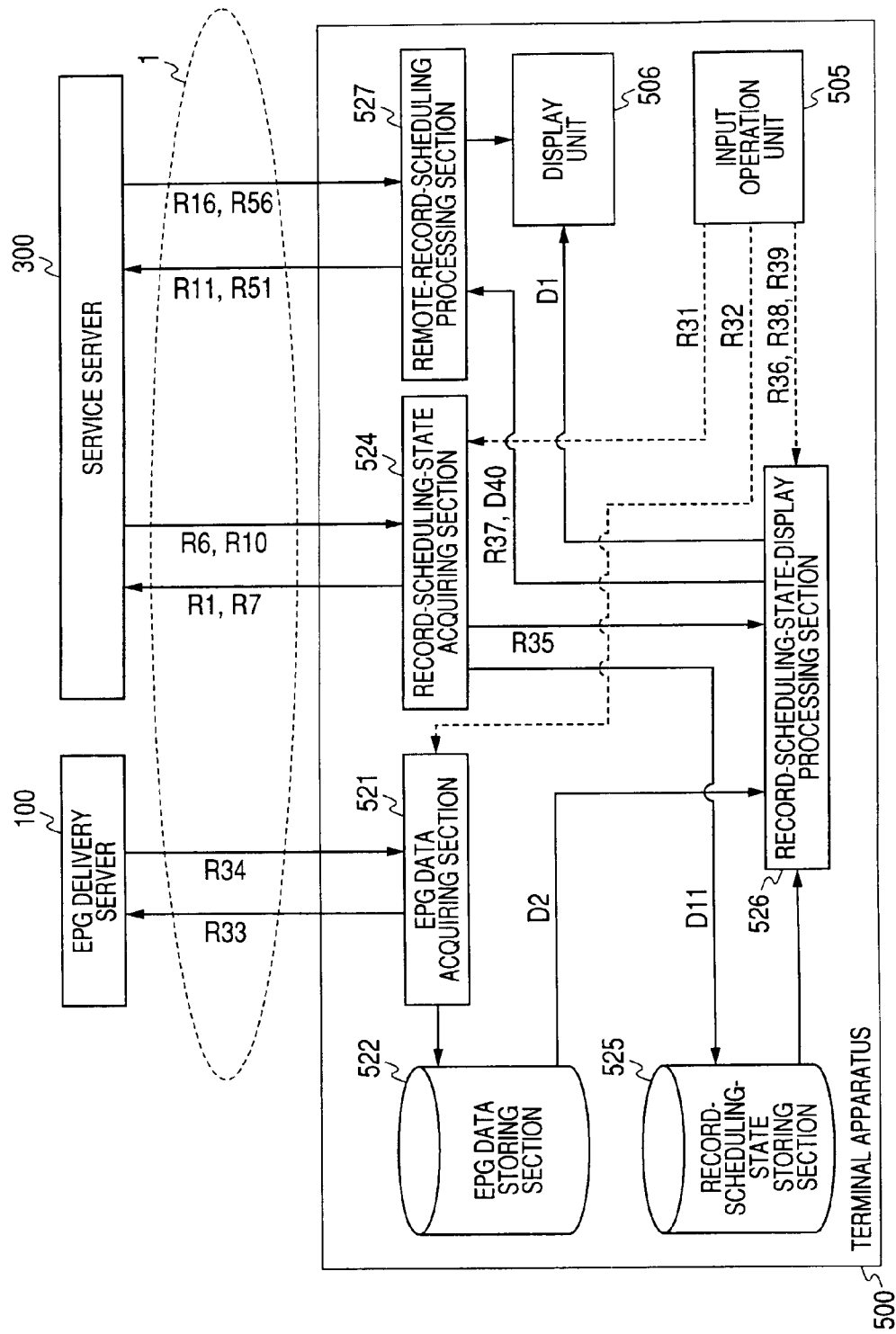
FIG. 6 is a block diagram showing a configuration of software of the terminal apparatus.

In FIG. 6, first, the user gives the record scheduling state acquisition instruction R31 to the record-scheduling-state acquiring section 524 using the input operation unit 505 of the terminal apparatus 500. The record-scheduling-state acquiring section 524 transmits, with input of the record scheduling state acquisition instruction R31 as an opportunity, a controlled apparatus list acquisition request R7 including a control apparatus and service management ID to the service server 300 through the network 1.

Figure 3:
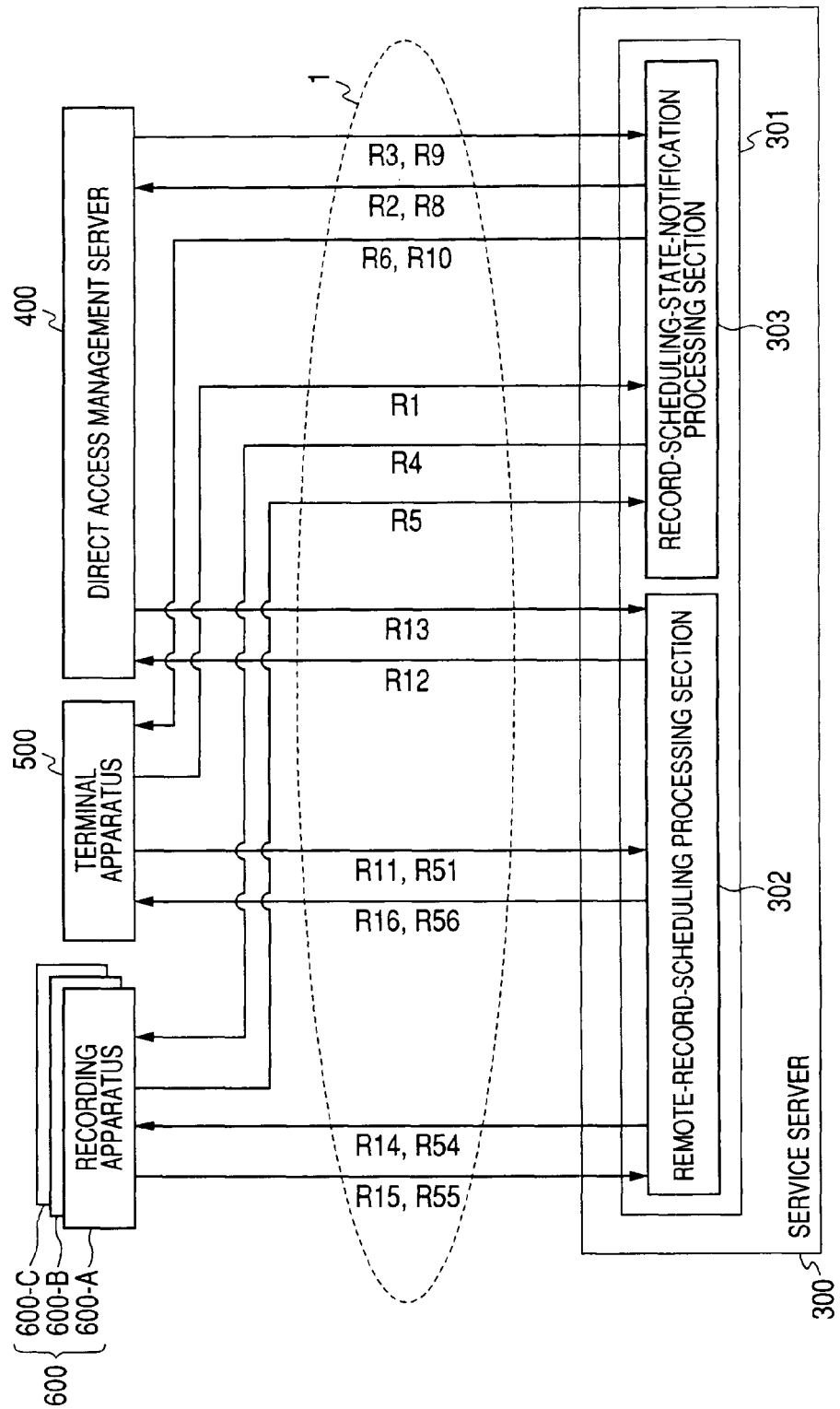
FIG. 3 is a block diagram showing a configuration of software of the service server.

In FIG. 3, the record-scheduling-state-notification processing section 303 in the service server 300 receives the controlled apparatus list acquisition request R7 from the terminal apparatus 500. The record-scheduling-state-notification processing section 303 transmits a controlled apparatus list acquisition request R8 including the control apparatus and service management ID included in the controlled apparatus list acquisition request R7 to the direct access management server 400 through the network 1.

Figure 4:
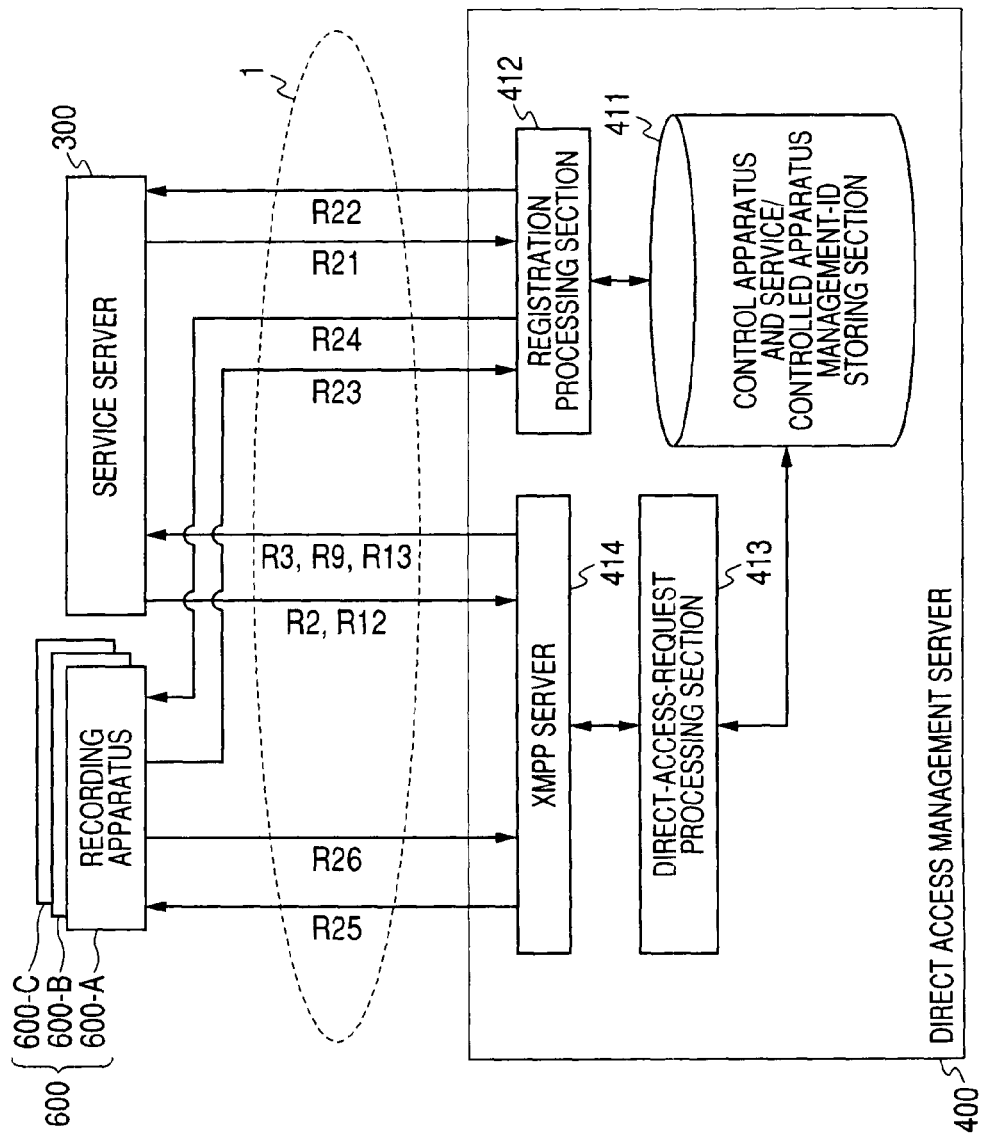
FIG. 4 is a block diagram showing a configuration of software of the direct access management server.

In FIG. 4, in the direct access management server 400, the XMPP server 414 for setting a bidirectional fulltime connection session with the registered recording apparatus 600 as a controlled apparatus is operating. The service server 300 establishes an XMPP session with the direct access management server 400 and exchanges information with the direct access management server 400 through the XMPP session.

The direct-access-request processing section 413 in the direct access management server 400 receives the controlled apparatus list acquisition request R8 including the control apparatus and service management ID from the service server 300 through the XMPP session. The direct-access-request processing section 413 determines controlled apparatus management IDs tied to the control apparatus and service management ID included in the direct access start request R8 from the control apparatus and service/controlled apparatus management-ID storing section 411. Subsequently, the direct-access-request processing section 413 determines controlled apparatus IDs and controlled apparatus names for a service server corresponding to the determined controlled apparatus management ID and transmits a controlled apparatus list acquisition response R9 including a list of the controlled apparatus IDs and the controlled apparatus names for a service server to the service server 300.

The record-scheduling-state-notification processing section 303 in the service server 300 extracts the list of the controlled apparatus IDs and the controlled apparatus names for a service server from the controlled apparatus list acquisition response R9 received from the direct access management server 400 and transmits a controlled apparatus list acquisition response R10 including the extracted list of the controlled apparatus IDs and the controlled apparatus names for a service server to the terminal apparatus 500.

Thereafter, the terminal apparatus 500 transmits the record scheduling state acquisition request R1 including the acquired controlled apparatus IDs for a service server and the control apparatus and service management ID to the service server 300 through the network 1.

In FIG. 3, the record-scheduling-state-notification processing section 303 in the service server 300 receives the record scheduling state acquisition request R1 from the terminal apparatus 500. The record-scheduling-state-notification processing section 303 in the service server 300 transmits the direct access start request R2 including the controlled apparatus IDs for a service server and the control apparatus and service management ID included in the record scheduling state acquisition request R1 to the direct access management server 400 through the network 1.

The direct-access-request processing section 413 in the direct access management server 400 receives the direct access start request R2 including the controlled apparatus IDs for a service server and the control apparatus and service management ID from the service server 300 through the XMPP session. The direct access request processing section 413 determines one controlled apparatus management ID tied to the control apparatus and service management ID included in the direct access start request R2 from the control apparatus and service/controlled apparatus management-ID storing section 411 and transmits the direct access information acquisition request R25 to the recording apparatus 600 corresponding to the controlled apparatus management ID through the fulltime connection session.

The fulltime connection session established between the recording apparatus 600 and the direct access management server 400 is managed in association with the controlled apparatus management ID corresponding to the connection object recording apparatus 600. Therefore, it is possible to determine the fulltime connection session used for the transmission of the direct access information acquisition request R25 by determining the controlled apparatus management ID tied to the control apparatus and service management ID included in the direct access start request R2.

In FIG. 8, the direct-access-information providing section 631 in the recording apparatus 600 receives the direct access information acquisition request R25 from the direct access management server 400 through the fulltime connection session. The direct-access-information providing section 631 creates a URI for direct access including a global IP address and a port number mapped to the local IP address and the port number of the recording apparatus 600 in the router for connecting the recording apparatus 600 to the network 1 and transmits a direct access information acquisition response R26 including the URI for direct access to the direct access management server 400 through the fulltime connection session.

In FIG. 4, the direct-access-request processing section 413 in the direct access management server 400 receives the direct access information acquisition response R26 from one recording apparatus 600 through the fulltime connection session. The direct-access-request processing section 413 transmits the direct access start response R3 including the URI for direct access to the service server 300 through the network 1.

In FIG. 3, the record-scheduling-state-notification processing section 303 in the service server 300 receives the direct access start response R3 including the URI for direct access from the direct access management server 400 through the network 1. The record-scheduling-state-notification processing section 303 accesses the URI for direct access included in the direct access start response R3, i.e., one recording apparatus 600 and transmits the record scheduling state acquisition request R4 to the recording apparatus 600.

In FIG. 8, the record-scheduling-state providing section 630 in the recording apparatus 600 receives the record scheduling state acquisition request R4 from the service server 300 through the network 1. The record-scheduling-state providing section 630 transmits the data D11 of the record scheduling states, which are contents of the record scheduling list and the recommended program list stored in the record-scheduling-state storing section 626, to the service server 300 through the network 1. Information for specifying a record scheduling candidate program also includes information for identifying whether this program is a "recommended program" or a "more recommended program".

In FIG. 3, the record-scheduling-state-notification processing section 303 in the service server 300 repeats the processing for transmitting the direct access start request R2 to the direct access management server 400 through the network 1 and the subsequent processing until the data D11 of record scheduling states of all the recording apparatuses 600 (600-A, 600-B, and 600-C) is obtained. When the data D11 of the recording scheduling states of all the recording apparatuses 600 (600-A, 600-B, and 600-C) is obtained, the record-scheduling-state-notification processing section 303 transmits the data D11 of the record scheduling states of the respective recording apparatuses 600 (600-A, 600-B, and 600-C) to the terminal apparatus 500 through the network 1 as the record scheduling state acquisition response R6 together with the controlled apparatus IDs and the controlled apparatus names for a service server of the respective recording apparatuses 600 (600-A, 600-B, and 600-C).

In FIG. 6, the record-scheduling-state acquiring section 524 in the terminal apparatus 500 stores the data D11 of the record scheduling states in the respective recording apparatuses 600 (600-A, 600-B, and 600-C), which is received from the service server 300 as the record scheduling state acquisition response R6, in the record-scheduling-state storing section 525.

FIG. 13 is a diagram showing an example of record scheduling state data stored in the record-scheduling-state storing section 525. As shown in the figure, as apparatus names, "recording apparatus A", "recording apparatus B", and "recording apparatus C" are associated with the controlled apparatus IDs of the respective recording apparatuses 600 (600-A, 600-B, and 600-C) and stored. Program specifying information of record scheduled/record scheduling candidate, which is the data D11 of the record scheduling states, is associated with the respective apparatus names and stored.

Consequently, the record scheduling states in the respective recording apparatuses 600 (600-A, 600-B, and 600-C) are stored in the terminal apparatus 500 together with the controlled apparatus IDs and the controlled apparatus names for a service server of the recording apparatuses 600.

An operation for displaying, in the terminal apparatus 500, the record scheduling states in the respective recording apparatuses 600 (600-A, 600-B, and 600-C) is explained.

In FIG. 6, when the data D11 of the record scheduling states in the respective recording apparatuses 600 (600-A, 600-B, and 600-C) is stored in the record-scheduling-state storing section 525, the record-scheduling-state acquiring section 524 in the terminal apparatus 500 outputs a record scheduling state display command R35 to the record-scheduling-state-display processing section 526.

The record-scheduling-state-display processing section 526 receives the record scheduling state display command R35 from the record-scheduling-state acquiring section 524. The record-scheduling-state-display processing section 526 performs processing for creating, on the basis of the EPG data stored in the EPG data storing section 522 and the record scheduling states of the respective recording apparatuses 600 (600-A, 600-B, and 600-C) stored in the record-scheduling-state storing section 525, EPG display data D1 that reflects the record scheduling states of the respective recording apparatuses 600 (600-A, 600-B, and 600-C) and displaying the EPG display data D1 on the display unit 506.

Figure 9:
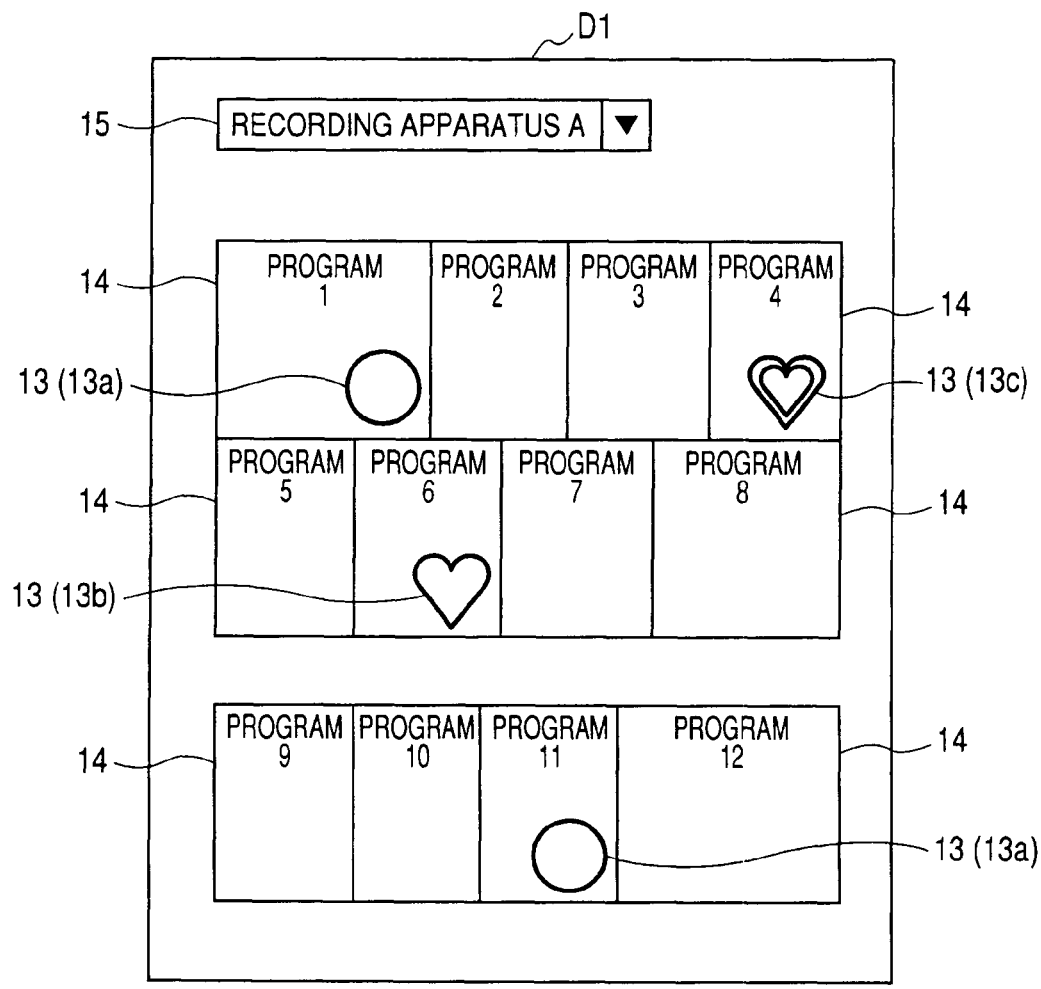
FIG. 9 is a diagram showing an example of EPG display data that reflects a record scheduling state of a recording apparatus A.

FIG. 9 is a diagram showing an example of the EPG display data D1 that reflects the record scheduling states. As shown in the figure, the EPG display data D1 includes plural areas 14 in which guide information for respective programs are described and a pull-down list 15 in which the recording apparatus 600 can be selected. The pull-down list 15 is created on the basis of the apparatus names of the respective recording apparatuses 600 (600-A, 600-B, and 600-C) stored in the record-scheduling-state storing section 525 by the record-scheduling-state-display processing section 526. In this embodiment, as options in the pull-down list 15, there are "recording apparatus A", "recording apparatus B", "recording apparatus C", "all recording apparatuses", and the like.

It is assumed that an initial value of the apparatus name in the pull-down list 15 is "recording apparatus A". In this default state, the record-scheduling-state-display processing section 526 displays, on the basis of the EPG data stored in the EPG data storing section 522 and the record scheduling state of the recording apparatus 600-A stored in the record-scheduling-state storing section 525, EPG display data D1 that reflects the record scheduling state of the recording apparatus 600-A. The record-scheduling-state-display processing section 526 displays the EPG display data D1 on the display unit 506. FIG. 9 shows the EPG display data D1 at this point.

The record-scheduling-state-display processing section 526 determines, on the basis of the record scheduling state of the recording apparatus 600-A, a record-scheduled or record scheduling candidate program among programs and gives a mark 13 indicating the record scheduling state to the area 14 for the program. As the mark 13 indicating the record scheduling state, there are a record scheduled mark 13a indicating that record is scheduled, a recommended program mark 13b indicating a "recommended program" in record scheduling candidates, and a more recommended program mark 13c indicating a "more recommended program" in the record scheduling candidates. As the record scheduled mark 13a, the recommended program mark 13b, and the more recommended program mark 13c, unique marks are adopted such that the user can identify the record scheduling states at a glance. Instead of using the marks, the record scheduling states may be identifiable by colors such as background colors and character colors of the areas 14 or text data indicating the record scheduling states may be inserted in the areas 14. When a record scheduling candidate program is record-scheduled, it is also possible that only the record scheduled mark 13a is displayed and the recommended program mark 13b and the more recommended program mark 13c indicating a record scheduling candidate are not displayed.

The user of the terminal apparatus 500 can select another apparatus name in the pull-down list 15 using the input operation unit 505 on a screen of an EPG that reflects the record scheduling states shown in FIG. 9. Referring back to FIG. 6, when another apparatus name is selected by the user in the pull-down list 5, an apparatus switching command R38 is inputted from the input operation unit 505 to the record-scheduling-state-display processing section 526.

Figure 10:
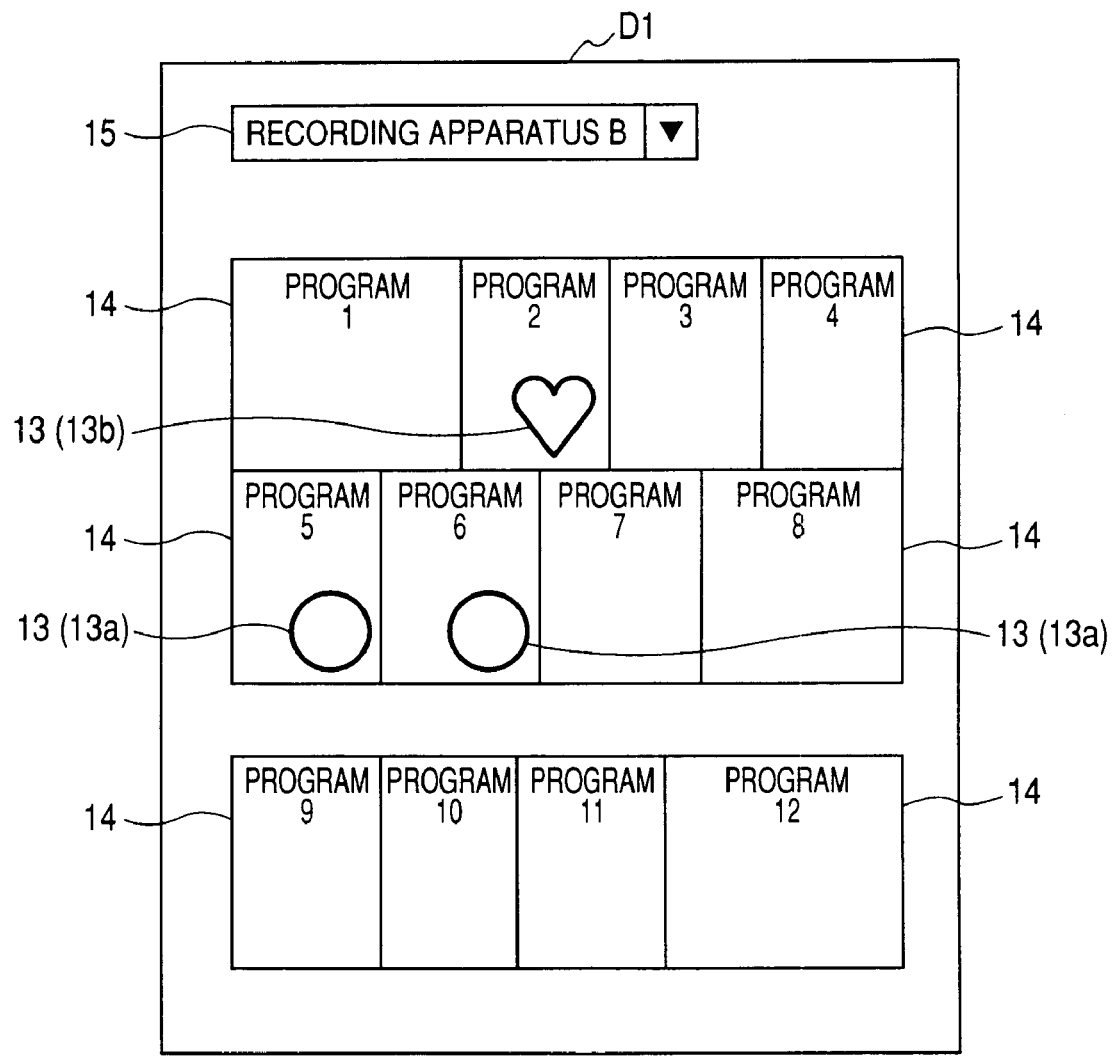
FIG. 10 is a diagram showing an example of EPG display data that reflects a record scheduling state of a recording apparatus B.
Figure 11:
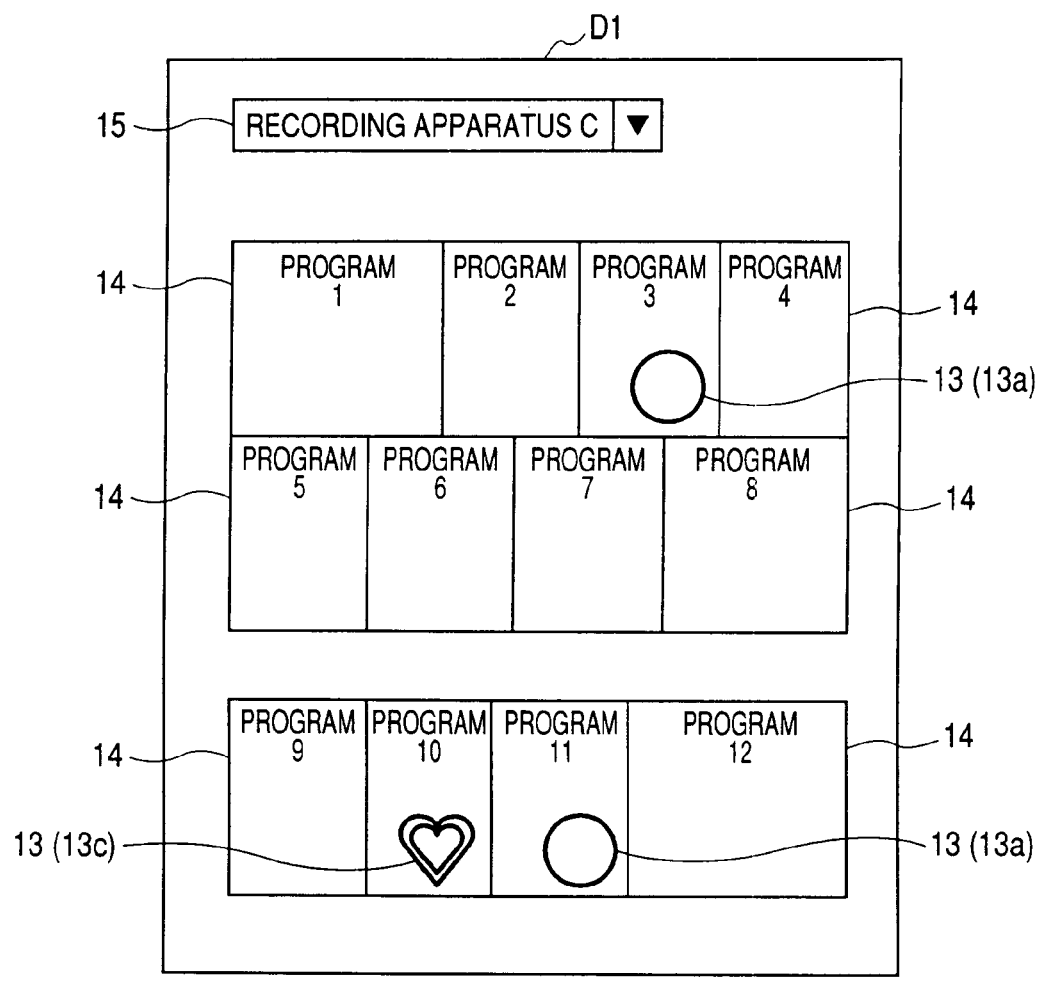
FIG. 11 is a diagram showing an example of EPG display data that reflects a record scheduling state of a recording apparatus C.

When the apparatus switching command R38 is inputted, the record-scheduling-state-display processing section 526 determines the apparatus name selected in the pull-down list 15, creates EPG display data D1 that reflects a record scheduling state of the recording apparatus 600 corresponding to the apparatus name again, and outputs the EPG display data D1 to the display unit 506. FIG. 10 shows an example of EPG display data D1 at the time when "recording apparatus B" as another apparatus name is selected by the user in the pull-down list 15. FIG. 11 shows an example of EPG display data D1 at the time when "recording apparatus C" as another apparatus name is selected by the user in the pull-down list 15.

Figure 12:
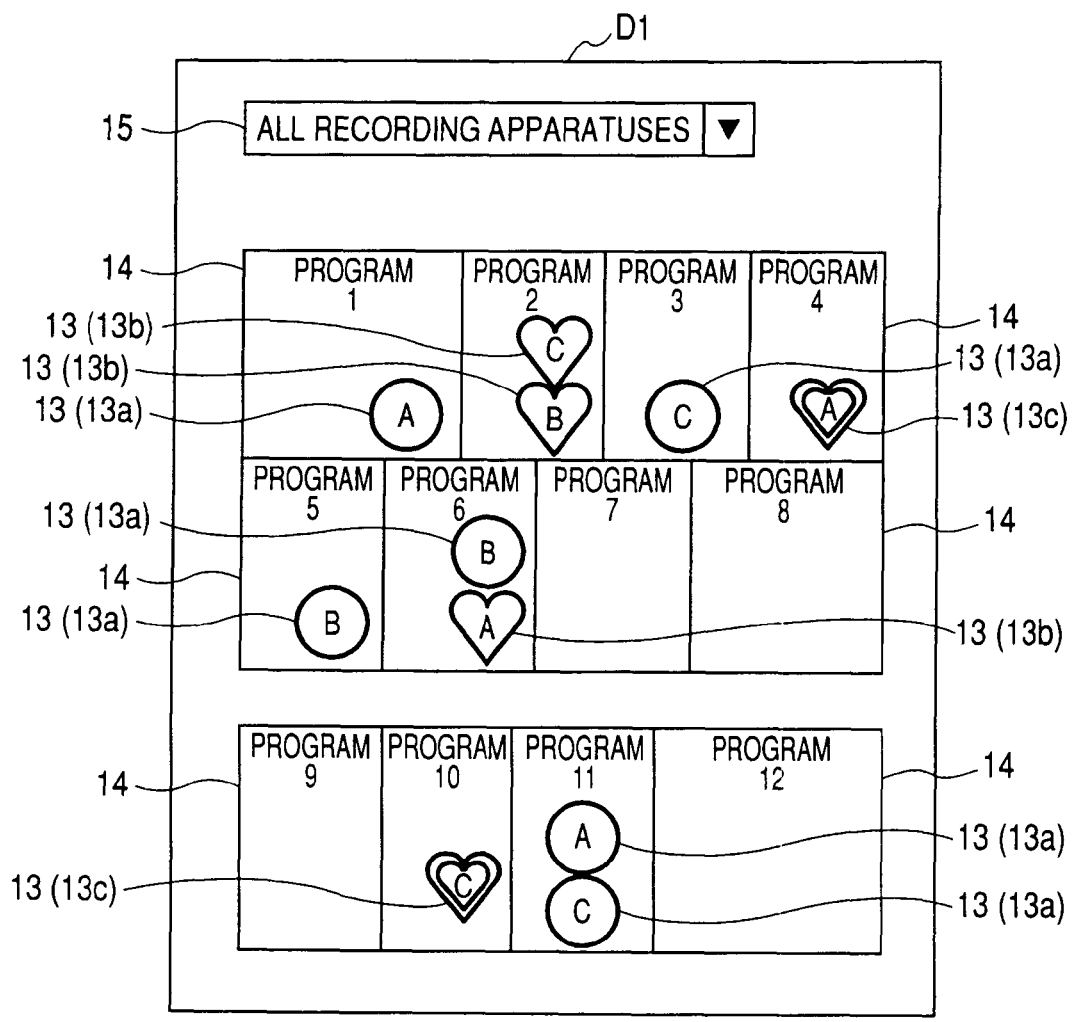
FIG. 12 is a diagram showing an example of EPG display data in which the record scheduling states of all the recording apparatuses are united.

The user of the terminal apparatus 500 selects "all recording apparatuses" in the pull-down list 15 using the input operation unit 505 on the screen of the EPG that reflects the record scheduling states shown in FIG. 9. As shown in FIG. 12, the record-scheduling-state-display processing section 526 creates EPG display data D1 in which the record scheduling states of all the recording apparatuses 600 (600-A, 600-B, and 600-C) are united and outputs the EPG display data D1 to the display unit 506. Here, representations identifying the recording apparatuses corresponding to the marks 13a, 13b, and 13c are given to the marks such that, for example, concerning a program to which the mark 13 indicating a record scheduling state is given, the user can identify a record scheduling state of which recording apparatus 600 a record scheduling state indicated by the mark corresponds to. In this embodiment, the apparatus names of the recording apparatuses are inserted in the marks 13a, 13b, and 13c. For example, the mark 13 inserted with a character "A" indicates the record scheduling state concerning the recording apparatus 600-A with the apparatus name "recording apparatus A". The mark 13 inserted with a character "B" indicates the record scheduling state concerning the recording apparatus 600-B with the apparatus name "recording apparatus B". The mark 13 inserted with a character "C" indicates the record scheduling state concerning the recording apparatus 600-C with the apparatus name "recording apparatus C". When plural marks 13 are given to the area 14 for one program, this indicates that the program is any one of a record-scheduled program or a record scheduling candidate program or both in the plural recording apparatuses 600. For example, in FIG. 12, a "program 6" is a record-scheduled program in the recording apparatus 600-B with the apparatus name "recording apparatus B" and is a record scheduling candidate program as a "recommended program" in the recording apparatus 600-A with the apparatus name "recording apparatus A".

An operation for selecting a program desired to be record-scheduled and performing remote record scheduling on the screen of the EPG that reflects the record scheduling states is explained.

In FIG. 6, first, the user of the terminal apparatus 500 selects, using the input operation unit 505, a program desired to be remote-record-scheduled and the recording apparatus 600 at a record scheduling destination out of all programs in the EPG display data D1 displayed on the display unit 506 and inputs the remote record scheduling instruction R36. The selection of the recording apparatus 600 at the record scheduling destination is performed by selecting an apparatus name in the pull-down list 15. The selection of a program is performed by selecting the program in the EPG display data D1. In other words, a recording apparatus selected in the pull-down list 15 at a point when a program is selected in the EPG display data D1 is set as a recording apparatus at a record scheduling destination. In selecting a program, the user can recognize record-scheduled programs and record scheduling candidate programs on the basis of the marks 13. Thus, it is possible to prevent one program from being redundantly record-scheduled and prevent omission of record scheduling for a program matching a taste of the user by displaying the marks 13b and 13c of record scheduling candidates.

The record-scheduling-state-display processing section 526 receives the remote record scheduling instruction R36. The record-scheduling-state-display processing section 526 extracts, from the EPG data stored in the EPG data storing section 522, the record scheduling information D2 such as a program ID, a channel name, a broadcast date, broadcast start and end times, and a title, which is information necessary for remote record scheduling of the selected program. The record-scheduling-state-display processing section 526 outputs the remote record scheduling issue command R37 including the record scheduling information D2 and the controlled apparatus ID for a service server of the recording apparatus 600 at a remote record scheduling destination to the remote-record-scheduling processing section 527. The remote-record-scheduling processing section 527 receives the remote record scheduling issue command R37 from the record-scheduling-state-display processing section 526. The remote-record-scheduling processing section 527 transmits the remote record scheduling request R11 including the control apparatus and service management ID, the controlled apparatus ID for a service server of the recording apparatus 600 at the remote record scheduling destination, and the record scheduling information D2 to the service server 300 through the network 1.

In FIG. 3, the remote-record-scheduling processing section 302 in the service server 300 receives the remote record scheduling request R11 from the terminal apparatus 500. The remote-record-scheduling processing section 302 transmits the direct access start request R12 including the control apparatus and service management ID and the controlled apparatus ID for a service server of the recording apparatus 600 at the remote record scheduling destination extracted from the remote record scheduling request R11 to the direct access management server 400. The remote-record-scheduling processing section 302 receives the direct access start response R13 including a URI for direct access of the recording apparatus 600 at the remote record scheduling destination from the direct access management server 400.

In FIG. 3, the remote-record-scheduling processing section 302 in the service server 300 receives the direct access start response R3 from the direct access management server 400. The remote-record-scheduling processing section 302 accesses the URI for direct access included in the direct access start response R3, i.e., the recording apparatus 600 and transmits the remote record scheduling command R14 including the record scheduling information D2 to the recording apparatus 600.

In FIG. 8, the remote-record-scheduling processing section 627 in the recording apparatus 600 receives the remote record scheduling command R14 transmitted from the service server 300 through the network 1. The remote-record-scheduling processing section 627 registers the record scheduling information D2 included in the remote record scheduling command R14 in the record scheduling list stored in the record-scheduling-state storing section 626. Thereafter, the remote-record-scheduling processing section 627 transmits the remote record scheduling result notice R15 indicating completion of the remote record scheduling to the service server 300 through the network 1.

In FIG. 3, the remote-record-scheduling processing section 302 in the service server 300 receives the remote record scheduling result notice R15 from the remote-record-scheduling processing section 527 in the recording apparatus 600. The remote-record-scheduling processing section 302 transmits the remote record scheduling result notice R16 to the terminal apparatus 500, which is a remote record scheduling request source, through the network 1.

In FIG. 6, the remote-record-scheduling processing section 527 in the terminal apparatus 500 receives the remote record scheduling result notice R16 from the service server 300 through the network 1. The remote-record-scheduling processing section 527 displays a result of the remote record scheduling on the display unit 506.

The remote record scheduling for the program selected by the user in the terminal apparatus 500 is completed.

When "all recording apparatuses" is selected as a recording apparatus at a remote record scheduling destination, the processing for transmitting the direct access start request R12 from the service server 300 to the direct access management server 400 and the subsequent processing are repeated by the number of recording apparatuses.

In FIG. 8, in each of the recording apparatuses 600 (600-A, 600-B, and 600-C), the program acquiring section 623 selectively receives, on the basis of the record scheduling information D2 registered in the record scheduling list in the record-scheduling-state storing section 626, programs transmitted with an IP multicast broadcast and the like by the program delivery server 200 through the network 1 and programs transmitted with broadcast waves from the respective broadcasting stations 3 such as programs of a terrestrial analog television broadcast, a terrestrial digital television broadcast, a CS digital broadcast, and a BS digital broadcast. The program acquiring section 623 records the programs in the program-data storing section 629.

An operation for canceling record scheduling, which is already set in the recording apparatus 600, according to a command from the terminal apparatus 500 is explained. The cancellation of the record scheduling is carried out when the user of the terminal apparatus 500 finds that record scheduling for the same program is redundantly set in the plural recording apparatuses 600, for example, when record scheduling for a "program 12" is redundantly set in the recording apparatus 600-A and the recording apparatus 600-C in FIG. 12.

In FIG. 6, first, the user of the terminal apparatus 500 selects, using the input operation unit 505, a program redundantly record-scheduled in two recording apparatuses 600 in the EPG display data D1 displayed on the display unit 506, designates an apparatus name of one of the recording apparatuses 600 for which the user desires to cancel the record scheduling, and inputs a record scheduling cancellation instruction R39.

The record-scheduling-state-display processing section 526 receives the record scheduling cancellation instruction R39. The record-scheduling-state-display processing section 526 extracts, for example, a program ID for identifying the selected program, which is information necessary for record scheduling cancellation for the selected program, from the EPG data. The record-scheduling-state-display processing section 526 outputs a record scheduling cancellation request issue command R40 including the record scheduling cancellation information, the control apparatus and service management ID, and the controlled apparatus ID for a service server of the recording apparatus 600 at a record scheduling cancellation destination to the remote-record-scheduling processing section 527. The remote-record-scheduling processing section 527 receives the record scheduling cancellation request issue command R40 from the record-scheduling-state-display processing section 526. The remote-record-scheduling processing section 527 transmits a record scheduling cancellation request R51 including the record scheduling cancellation information, the control apparatus and service management ID, and the controlled apparatus ID for a service server of the recording apparatus 600 at the record scheduling cancellation destination to the service server 300 through the network 1.

In FIG. 3, the remote-record-scheduling processing section 302 in the service server 300 receives the record scheduling cancellation request R51 from the terminal apparatus 500. The remote-record-scheduling processing section 302 transmits the direct access start request R12 to the direct access management server 400 through the network 1. The remote-record-scheduling processing section 302 receives the direct access start response R13 including a URI for direct access of the recording apparatus 600 tied to a combination of the terminal apparatus 500 and the remote record scheduling service from the direct access management server 400.

In FIG. 3, the remote-record-scheduling processing section 302 in the service server 300 receives the direct access start response R13 from the direct access management server 400. The remote-record-scheduling processing section 302 accesses the URI for direct access included in the direct access start response R13, i.e., the recording apparatus 600 and transmits a record scheduling cancellation command R54 including the record scheduling cancellation information to the recording apparatus 600.

In FIG. 8, the remote-record-scheduling processing section 627 in the recording apparatus 600 receives the record scheduling cancellation command R54 transmitted from the service server 300 through the network 1. The remote-record-scheduling processing section 627 updates the record scheduling list in the record-scheduling-state storing section 626 on the basis of the record scheduling cancellation information included in the record scheduling cancellation command R54. For example, since the program IDs are included in the record scheduling information registered in the record scheduling list, the remote-record-scheduling processing section 627 can cancel the record scheduling by finding record scheduling information, a program ID of which coincide with the program ID as the record scheduling cancellation information included in the record scheduling cancellation command R54, from the record scheduling list and deleting the record scheduling information. Thereafter, the remote-record-scheduling processing section 627 transmits a record scheduling cancellation result notice R55 indicating completion of the record scheduling cancellation to the service server 300 through the network 1.

In FIG. 3, the remote-record-scheduling processing section 302 in the service server 300 receives the record scheduling cancellation result notice R55 from the recording apparatus 600. The remote-record-scheduling processing section 302 transmits the record scheduling cancellation result notice R56 to the terminal apparatus 500, which is the remote record scheduling request source, through the network 1.

In FIG. 6, the remote-record-scheduling processing section 527 in the terminal apparatus 500 receives the record scheduling cancellation result notice R56 from the service server 300 through the network 1. The remote-record-scheduling processing section 527 displays a result of the record scheduling cancellation on the display unit 506.

The record scheduling cancellation for the program selected by the user in the terminal apparatus 500 is completed.

As explained above, according to this embodiment, a record scheduling state in the recording apparatus 600 is reflected on an EPG and displayed on the display unit 506 of the terminal apparatus 500. Therefore, for example, compared with the method of displaying the record scheduling list on the text basis, it is possible to efficiently check the record scheduling state. When the plural recording apparatuses 600 tied to the combination of the terminal apparatus 500 and the remote record scheduling service are connected to the network 1, as shown in FIG. 12, record scheduling states of all the recording apparatuses 600 (600-A, 600-B, and 600-C) are united and displayed. Therefore, the user unitarily check, in the terminal apparatus 500, the record scheduling states of the recording apparatuses 600 (600-A, 600-B, and 600-C). Consequently, it is possible to unitarily manage the record scheduling states of all the recording apparatuses 600 (600-A, 600-B, and 600-C) in the terminal apparatus 500. For example, it is possible to easily find that record scheduling for the same program is redundantly set in two or more recording apparatuses 600 and it is possible to cancel the record scheduling for one of the recording apparatuses 600 with operation of the terminal apparatus 500.

According to this embodiment, in the terminal apparatus 500, it is possible to not only reflect record-scheduled programs on the EPG as a record scheduling state but also reflect programs matching a taste of the user on the EPG as a record scheduling candidate. The user can select a program out of the programs and perform remote record scheduling for the terminal apparatus 600. In other words, in the terminal apparatus 500, the user can determine whether record scheduling should be performed while checking a record scheduling candidate program and, if necessary, designate the record scheduling candidate program on the EPG and perform the remote record scheduling.

In the explanation of the embodiment, the plural recording apparatuses 600 tied to the combination of the terminal apparatus 500 and the remote record scheduling service are connected to the network 1. However, when only one recording apparatus 600 is connected to the network 1, the pull-down list 15 for selecting a recording apparatus shown in FIG. 9 is unnecessary. An EPG that reflects a record scheduling state of the recording apparatus is displayed.

A second embodiment of the present invention is explained.

In the first embodiment described above, the user of the terminal apparatus 500 actively requests acquisition of a record scheduling state from the recording apparatus 600 through the service server 300. However, in the second embodiment, the recording apparatus 600 actively transmits, with update of a record scheduling state in the recording apparatus 600 as an opportunity, data of the record scheduling state after the update to the terminal apparatus 500. The second embodiment is explained in detail below.

FIG. 14 is a diagram showing the overall structure of a network system 20 according to the second embodiment.

The network system 20 includes the EPG delivery server 100, the program delivery server 200, a service server 700, a direct access management server 800, a terminal apparatus 900, and recording apparatuses 1000 (1000-A, 1000-B, and 1000-C) The servers and the apparatuses can be connected to be capable of communicating with one another through the network 1 such as the Internet. The EPG delivery server 100 and the program delivery server 200 are the same as those in the first embodiment.

The service server 700 is a server apparatus that performs, in response to the remote record scheduling request R11 from the terminal apparatus 800, a remote record scheduling service for, for example, causing the recording apparatuses 1000 to execute record scheduling for a program and causing the recording apparatuses 1000 to cancel the record scheduling. The remote record scheduling service includes a record scheduling state notification service for notifying the terminal apparatus 900 of data of record scheduling states actively transmitted from the recording apparatuses 1000.

The direct access management server 800 is a server apparatus that manages correspondence between a combination of the terminal apparatus 900 and the remote record scheduling service provided by the service server 700 and the recording apparatuses 1000 and performs processing concerning exchange and the like of information necessary for the service server 700 to directly access the recording apparatuses 1000 through the network 1 and information necessary for the recording apparatuses 1000 to directly access the service server 700 through the network 1.

The terminal apparatus 900 receives data of record scheduling states actively transmitted from the respective recording apparatuses 1000 (1000-A, 1000-B, and 1000-C) through the service server 700 and stores the data. The terminal apparatus 900 creates display data obtained by reflecting the record scheduling states on an EPG acquired from the EPG delivery server 100 and displays the display data. The terminal apparatus 900 causes a user to select a program to be remote-record-scheduled on the EPG that reflects the record scheduling states. The terminal apparatus 900 transmits the remote record scheduling request R11 to the service server 700 to perform remote record scheduling for the program.

Each of the recording apparatuses 1000 is a recording apparatus that is capable of performing record scheduling such as record scheduling by manual operation of the user and remote record scheduling from the terminal apparatus 900 through the service server 700. The recording apparatus 1000 manages a record scheduling state of the recording apparatus 1000 itself and is capable of transmitting, with a change in the record scheduling state as an opportunity, data of the record scheduling state to the terminal apparatus 900 through the service server 700.

Figure 15:
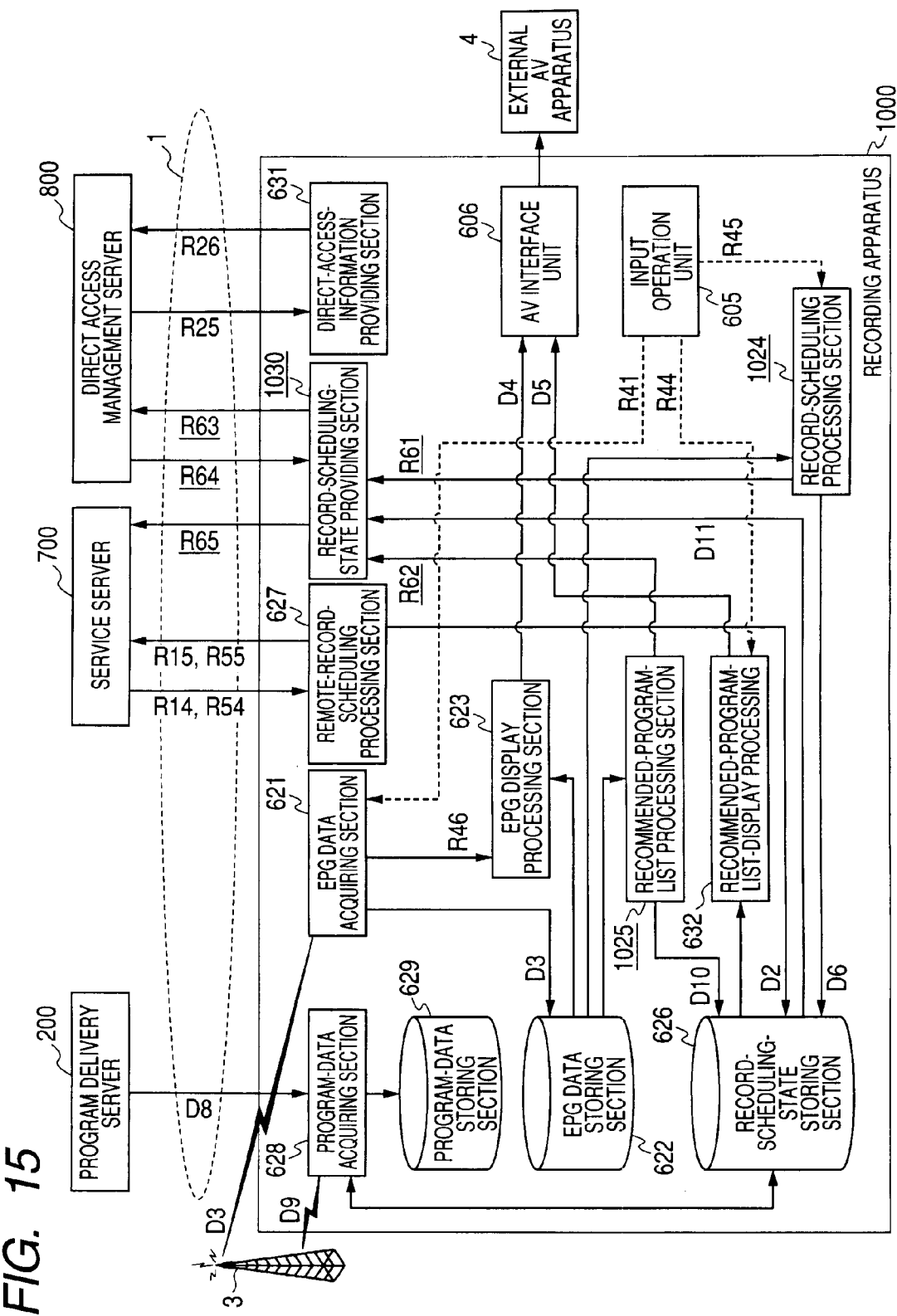
FIG. 15 is a diagram showing a configuration of software of a recording apparatus shown in FIG. 14.

FIG. 15 is a diagram showing a configuration of software of the recording apparatus 1000. A configuration of hardware of the recording apparatus 1000 is the same as that of the recording apparatus 600 according to the first embodiment.

As shown in the figure, the recording apparatus 1000 includes the EPG data acquiring section 621, the EPG data storing section 622, the EPG display processing section 623, a record-scheduling processing section 1024, a recommended-program-list processing section 1025, the record-scheduling-state storing section 626, the recommended-program-list-display processing section 632, the remote-record-scheduling processing section 627, the program-data acquiring section 628, the program-data storing section 629, a record-scheduling-state providing section 1030, and the direct-access-information providing section 631. Functions of the record-scheduling processing section 1024, the recommended-program-list processing section 1025, and the record-scheduling-state providing section 1030 are different from the functions of the sections corresponding thereto in the first embodiment. Functions of the other sections are the same as those of the sections corresponding thereto in the first embodiment. Therefore, redundant explanation of the sections having the same functions is omitted.

The user selects a program to be record-scheduled and inputs the record scheduling instruction R45 for the program using the input operation unit 605 on an EPG or a recommended program list displayed on the external AV apparatus 4. The record-scheduling processing section 1024 extracts the record scheduling information D6, which is information necessary for record scheduling of the program, from the EPG data stored in the EPG data storing section 622 and registers the record scheduling information D6 in the record scheduling list stored in the record-scheduling-state storing section 626. Every time the record scheduling information D6 is registered, the record-scheduling processing section 1024 transmits a record scheduling state transmission request R61 to the record-scheduling-state providing section 1030.

The recommended-program-list processing section 1025 automatically retrieves, for example, on the basis of keys such as genres, titles, and performers of programs record-scheduled by the user in the past, a program that the user would be fond of from the EPG data D3 stored in the EPG data storing section 622. The recommended-program-list processing section 1025 registers the program as the record scheduling candidate information D10 in the recommended program list stored in the record-scheduling-state storing section 626. Every time such a program is registered, the recommendedprogram-list processing section 1025 transmits a record scheduling state transmission request R62 to the record-scheduling-state providing section 1030.

The record-scheduling-state providing section 1030 receives the record scheduling state transmission request R61 from the record-scheduling processing section 1024 or receives the record scheduling state transmission request R62 from the recommended-program-list processing section 1025. The record-scheduling-state providing section 1030 transmits a service server URL acquisition request R63, which includes a controlled apparatus ID for a recording apparatus of the recording apparatus 1000 and identification information of the terminal apparatus 900, for requesting acquisition of a URL of the service server 700 that provides the terminal apparatus 900 with a remote record scheduling service. The record-scheduling-state providing section 1030 receives a service server URL acquisition response R64 from the direct access management server 800. The record-scheduling-state providing section 1030 accesses the service server 700 on the basis of the service server URL acquisition response R64 and transmits a record scheduling state notice R65 including the data D11 of the record scheduling states, which are contents of the record scheduling list and the recommended program list stored in the record-scheduling-state storing section 626, and the identification information of the terminal apparatus 900 to the service server 700.

Figure 16:
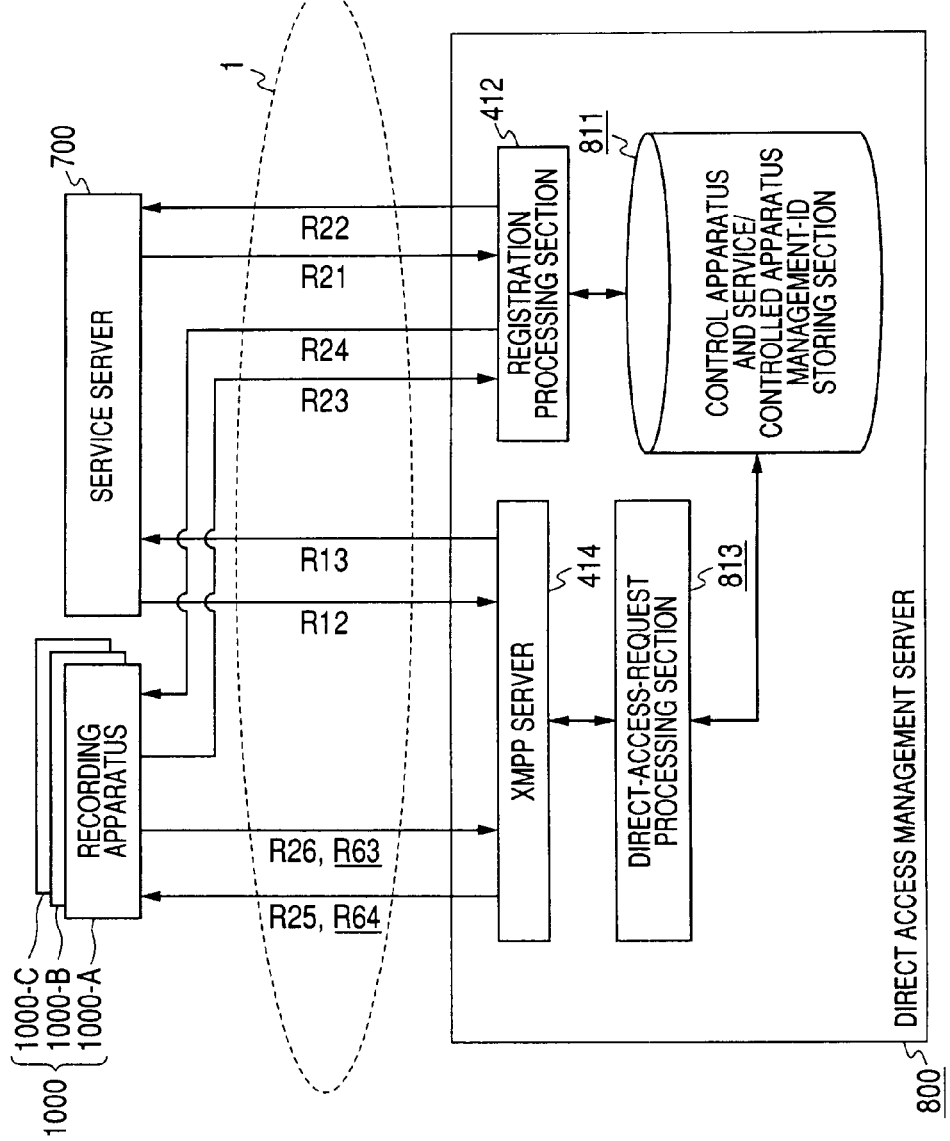
FIG. 16 is a diagram showing a configuration of software of a direct access management server shown in FIG. 14.

FIG. 16 is a diagram showing a configuration of software of the direct access management server 800. A configuration of hardware of the direct access management server 800 is the same as that of the direct access management server 400 according to the first embodiment.

The direct access management server 800 includes a control apparatus and service/controlled apparatus management-ID storing section 811, the registration processing section 412, a direct-access-request processing section 813, and the XMPP server 414. Functions of the control apparatus and service/controlled apparatus management-ID storing section 811 and the direct-access-request processing section 813 are different from those of the sections corresponding thereto in the first embodiment. Functions of the other sections are the same as those of the sections corresponding thereto in the first embodiment. Therefore, redundant explanation of the sections having the same functions is omitted.

In the control apparatus and service/controlled apparatus management-ID storing section 811, control apparatus and service management IDs, which are IDs given to combinations of the terminal apparatus 500 as a control apparatus and services of the service server 700, and controlled apparatus management IDs, which are IDs allocated to the recording apparatuses 1000 as controlled apparatuses, are tied to each other and stored. Information necessary for the recording apparatuses 1000 to directly access the service server 700 through the network 1 such as a URL (Uniform Resource Locator) of the service server 700 that provides the service is stored in association with the control apparatus and service management IDs. A correspondence relation among the controlled apparatus management IDs, controlled apparatus IDs for a service server, and controlled apparatus IDs for a recording apparatus is also stored in the control apparatus and service/controlled apparatus management-ID storing section 811.

The direct-access-request processing section 813 receives the service server URL acquisition request R63 from any one of the recording apparatuses 1000. The direct-access-request processing section 813 determines, on the basis of the information stored in the control apparatus and service/controlled apparatus management-ID storing section 811, the control apparatus and service management ID tied to the controlled apparatus management ID corresponding to the controlled ID for a recording apparatus included in the service server URL acquisition request R63. The direct-access-request processing section 813 further determines a URL of the service server 700 that provides the service with respect to the determined control apparatus and service management ID and transmits the service server URL acquisition response R64 including the service server URL to the recording apparatus 1000 at a request source.

Figure 17:
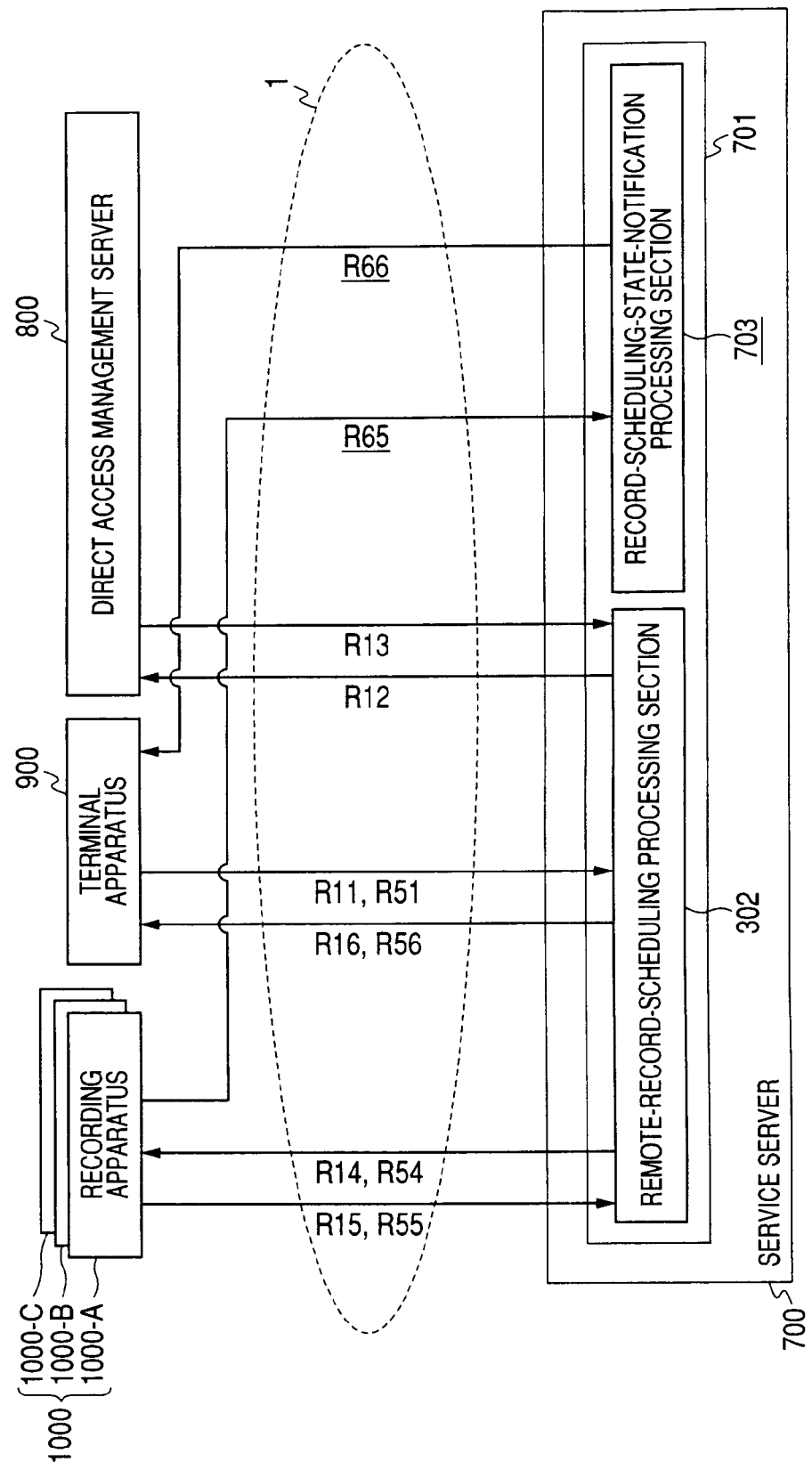
FIG. 17 is a diagram showing a configuration of software of a service server shown in FIG. 14.

FIG. 17 is a diagram showing a configuration of software of the service server 700. A configuration of hardware of the service server 700 is the same as that of the service server 300 according to the first embodiment.

The service server 700 includes a service executing section for executing a service concerning remote record scheduling. The service executing section 701 includes the remote-record-scheduling processing section 302 and a record-scheduling-state-notification processing section 703. A function of the record-scheduling-state-notification processing section 703 is different from the function of the section corresponding thereto in the first embodiment. The remote-record-scheduling processing section 302 is the same as that in the first embodiment.

The record-scheduling-state-notification processing section 703 receives the record scheduling state notice R65 from the recording apparatus 1000. The record-scheduling-state-notification processing section 703 accesses the terminal apparatus 900 on the basis of the identification information of the terminal apparatus 900 included in the record scheduling state notice R65 and transmits a record scheduling state notice R66 including the data of the record scheduling states and the identification information of the terminal apparatus 900 to the terminal apparatus 900.

Figure 18:
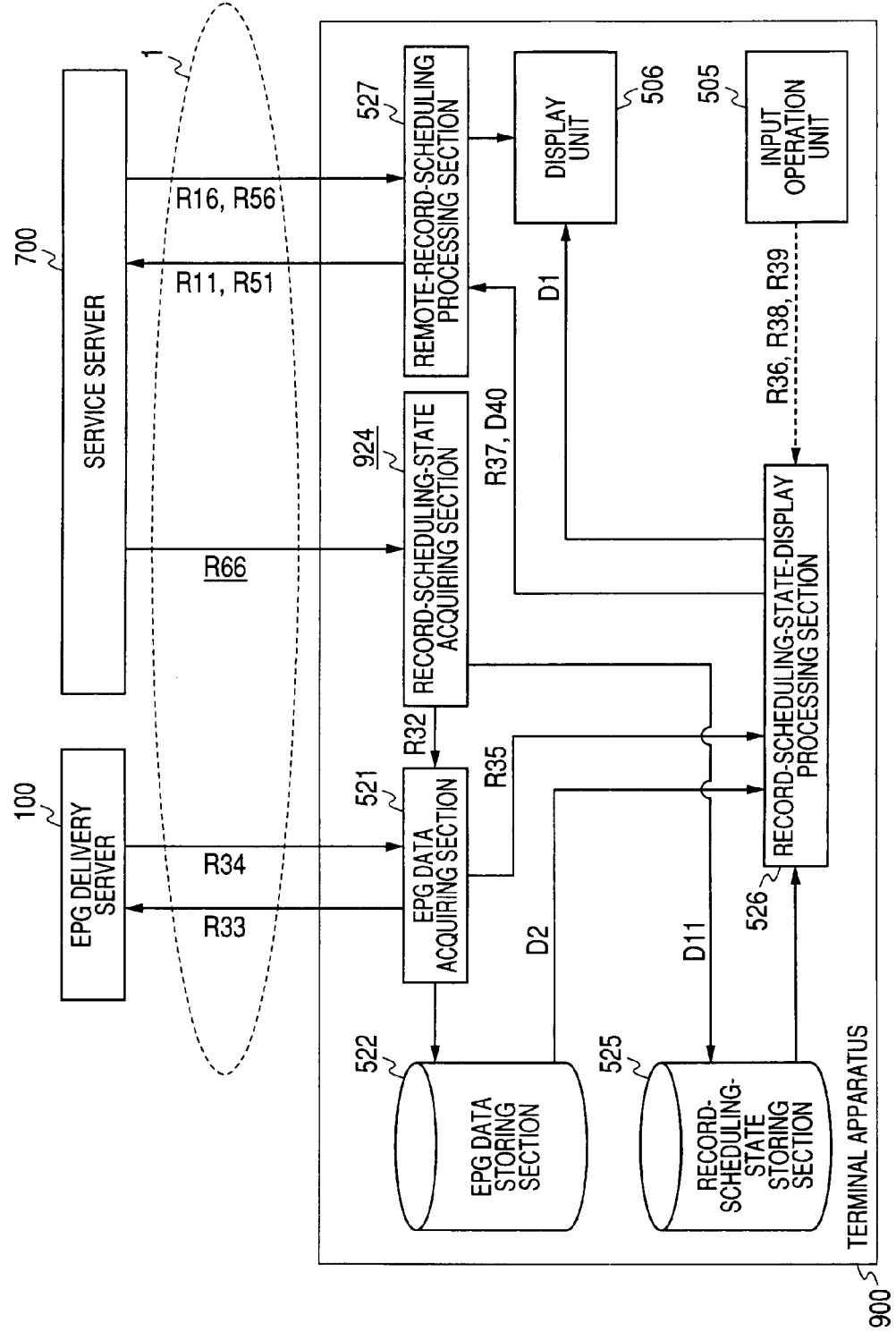
FIG. 18 is a diagram showing a configuration of software of a terminal apparatus shown in FIG. 14.

FIG. 18 is a diagram showing a configuration of software of the terminal apparatus 900. A configuration of hardware of the terminal apparatus 900 is the same as that of the terminal apparatus 500 according to the first embodiment.

As shown in the figure, the terminal apparatus 900 includes the EPG data acquiring section 521, the EPG data storing section 522, a record-scheduling-state acquiring section 924, the record-scheduling-state storing section 525, the record-scheduling-state-display processing section 526, and the remote-record-scheduling processing section 527. The EPG data storing section 522 and the record-scheduling-state storing section 525 are set in the storing section 512 or the RAM 504.

A function of the record-scheduling-state acquiring section 924 is different from the function of the section corresponding thereto in the first embodiment. Functions of the other sections are the same as those in the first embodiment. Therefore, redundant explanation of the sections having the same functions is omitted.

The record-scheduling-state acquiring section 924 stores, with reception of the record scheduling state notice R66 from the service server 700 as an opportunity, the data D11 of the record scheduling states included in the received record scheduling state notice R66 in the record-scheduling-state storing section 525. After acquiring the data of the record scheduling states, the record-scheduling-state acquiring section 924 transmits the EPG data acquisition request R32 to the EPG data acquiring section 521.

Operations in the second embodiment are explained.

In the recording apparatus 1000, operations concerning registration of record scheduling in the record scheduling list stored in the record-scheduling-state storing section 626 and registration of record scheduling candidates in the recommended program list stored in the record-scheduling-state storing section 626 are the same as those in the first embodiment. However, in the second embodiment, the recording apparatus 1000 notifies the terminal apparatus 900 of a record scheduling state with update of the record scheduling list or the recommended program list as an opportunity. This operation is explained below.

It is assumed that, in the direct access management server 800, tying of the control apparatus and service management IDs and the controlled apparatus management IDs has already been completed. It is assumed that, in the recording apparatus 1000, the identification information of the terminal apparatus 900 is stored during apparatus registration.

In FIG. 15, first, when new record scheduling information D6 is registered in the record scheduling list by the record-scheduling processing section 1024 in any one of the recording apparatuses 1000, the record-scheduling processing section 1024 gives the record scheduling state transmission request R61 to the record-scheduling-state providing section 1030. When new record scheduling candidate information D10 is registered in the recommended program list by the recommended-program-list processing section 1025, the recommended-program-list processing section 1025 gives the record scheduling state transmission request R62 to the record-scheduling-state providing section 1030.

The record-scheduling-state providing section 1030 receives the record scheduling state transmission request R61 or R62 from the record-scheduling processing section 1024 or the recommended-program-list processing section 1025. The record-scheduling-state providing section 1030 transmits the service server URL acquisition request R63 including the controlled apparatus ID for a recording apparatus of the recording apparatus 1000 to the direct access management server 800.

In FIG. 16, the direct-access-request processing section 813 in the direct access management server 800 receives the service server URL acquisition request R63 from the recording apparatus 1000. The direct-access-request processing section 813 determines, on the basis of the controlled apparatus ID for a recording apparatus included in the service server URL acquisition request R63 and the information stored in the control apparatus and service/controlled apparatus management-ID storing section 811, the control apparatus and service management ID tied to the controlled apparatus management ID corresponding to the controlled apparatus ID for a recording apparatus included in the service server URL acquisition request R63. The direct-access-request processing section 813 further determines a URL of the service server 700 that provides the service with respect to the determined control apparatus and service management ID and transmits the service server URL acquisition response R64 including the service server URL to the recording apparatus 1000 at a request source.

Referring back to FIG. 15, the record-scheduling-state providing section 1030 in the recording apparatus 1000 at the request source extracts the service server URL from the service server URL acquisition response R64 received from the direct access management server 800. The record-scheduling-state providing section 1030 accesses the service server 700 on the basis of the service server URL. The record-scheduling-state providing section 1030 transmits the record scheduling state notice R65 including the data D11 of the record scheduling states, which are contents of the record scheduling list and the recommended program list stored in the record-scheduling-state storing section 626, and the identification information of the terminal apparatus 900 at a transmission destination to the service server 700.

In FIG. 17, the record-scheduling-state-notification processing section 703 in the service server 700 receives the record scheduling state notice R65 from the recording apparatus 1000. The record-scheduling-state-notification processing section 703 accesses, on the basis of the identification information of the terminal apparatus 900 at the transmission source included in the record scheduling state notice R65, the terminal apparatus 900 corresponding to the identification information. The record-scheduling-state-notification processing section 703 transmits the record scheduling state notice R66 including the data D11 of the record scheduling states and the identification information of the terminal apparatus 900 to the terminal apparatus 900.

In FIG. 18, the record-scheduling-state acquiring section 924 in the terminal apparatus 900 receives the record scheduling state notice R66 from the service server 700. The record-scheduling-state acquiring section 924 stores the data D11 of the record scheduling states included in the received record scheduling state notice R66 in the record-scheduling-state storing section 525.

An operation for displaying an EPG that reflects the record scheduling state stored in the record-scheduling-state storing section 525, an operation for remote record scheduling, and an operation for canceling the remote record scheduling are the same as those in the first embodiment. Therefore, explanation of the operations is omitted.

As explained above, according to the second embodiment, as in the first embodiment, record scheduling state in the recording apparatus 1000 is reflected on an EPG and displayed on the display unit 506 of the terminal apparatus 900. Therefore, for example, compared with the method of displaying the record scheduling list on the text basis, it is possible to efficiently check the record scheduling state. Further, in this embodiment, with update of a record scheduling state in the recording apparatus 1000 as an opportunity, data of the record scheduling state is transmitted to the terminal apparatus 900 and displayed. Therefore, it is possible to typically check, in the terminal apparatus 900, a latest record scheduling state in the recording apparatus 1000.

Modifications of the first embodiment are explained.

First Modification

It is possible to register information concerning broadcast programs up to several weeks ahead in the record scheduling list and the recommended program list. Therefore, the following approach is possible. In the terminal apparatus 500, when acquisition of data of record scheduling states of the respective recording apparatuses 600 (600-A, 600-B, and 600-C) is requested, the record-scheduling-state acquiring section 524 designates conditions for a program, a record scheduling state of which is acquired, such as a period and a genre of a program in accordance from designation from the user and, in each of the recording apparatuses 600 (600-A, 600-B, and 600-C). The record-scheduling-state providing section 630 retrieves, from the record scheduling list and the recommended program list stored in the record-scheduling-state storing section 626, record-scheduled programs and record scheduling candidate programs that satisfy the conditions for a program, a record scheduling state of which is acquired, and responds to the terminal apparatus 500.

Second Modification

In the first embodiment, the service server 300 transmits, on the basis of the URI for direct access acquired from the direct access management server 400, the remote record scheduling command to the recording apparatus 600. However, if the terminal apparatus 500 acquires the URI for direct access from the service server 300 through the network 1, the terminal apparatus 500 may transmit a remote record scheduling command and a remote record scheduling cancellation command to the recording apparatus 600.

Third Modification

In the first embodiment, the service server 300 exclusive for the service for remote record scheduling is used. However, by incorporating software for performing the service for remote record scheduling in the EPG delivery server 100 or the program delivery server 200, it is also possible to use the EPG delivery server 100 or the program delivery server 200 as a service server.

Fourth Embodiment

In the first embodiment, the service server 300 and the direct access management server 400 are realized by the separate server apparatuses. However, by incorporating the software of the service server 300 and the software of the direct access management server 400 in one server apparatus, the service server 300 and the direct access management server 400 may be united as one server.

These modifications are also applicable to the second embodiment.

In the embodiments described above, exchange of data between the terminal apparatus and the recording apparatus is controlled using the service server and the direct access management server. However, the present invention is also applicable to a system in which a terminal apparatus and a recording apparatus directly control exchange of data without the intervention of servers.

It goes without saying that the present invention is not limited to the embodiments and various modifications of the embodiments are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A network system, comprising:
a terminal apparatus;
a recording apparatus; and
a network, wherein
the recording apparatus includes
   a record-scheduling-state storing section that stores data of a record scheduling state of the recording apparatus; and
   a record-scheduling-state providing section that transmits the data of the record scheduling state stored in the record-scheduling-state storing section through the network, and
the terminal apparatus includes
   a record-scheduling-state acquiring section that acquires the data of the record scheduling state of the recording apparatus through the network, the data of the record scheduling state including information regarding one or more programs to be recorded by the recording apparatus and information regarding one or more recommended programs recommended to be recorded by a user;
   an Electronic Program Guide (EPG) data acquiring section that acquires EPG data;
   a record-scheduling-state-display processing section that creates, based on the data of the record scheduling state acquired by the record-scheduling-state acquiring section and the EPG data acquired by the EPG data acquiring section, EPG display data that reflects the record scheduling state, the EPG display data including one or more first graphic symbols indicating that the corresponding one or more programs are to be recorded by the recording apparatus and one or more second graphic symbols, different from the first graphic symbols, indicating the corresponding one or more recommended programs; and
   a display unit that displays the EPG display data created by the record-scheduling-state-display processing section.

2. A terminal apparatus, comprising:
a record-scheduling-state acquiring section that acquires data of a record scheduling state of a recording apparatus through a network, the data of the record scheduling state including information regarding one or more programs to be recorded by the recording apparatus and information regarding one or more recommended programs recommended to be recorded by a user;
an Electronic Program Guide (EPG) data acquiring section that acquires EPG data;
a record-scheduling-state-display processing section that creates, based on the data of the record scheduling state acquired by the record-scheduling-state acquiring section and the EPG data acquired by the EPG data acquiring section, EPG display data that reflects the record scheduling state, the EPG display data including one or more first graphic symbols indicating that the corresponding one or more programs are to be recorded by the recording apparatus and one or more second graphic symbols, different from the first graphic symbols, indicating the corresponding one or more recommended programs; and
a display unit that displays the EPG display data created by the record-scheduling-state-display processing section.

3. The terminal apparatus according to claim 2, wherein the data of the record scheduling state of the recording apparatus includes data concerning the one or more programs to be recorded.

4. The terminal apparatus according to claim 2, wherein the data of the record scheduling state of the recording apparatus includes data concerning the one or more programs to be recorded and data concerning the one or more recommended programs.

5. The terminal apparatus according to claim 4, wherein the record-scheduling-state-display processing section creates EPG display data that reflects the record scheduling state such that it is possible to identify the one or more programs to be recorded and the one or more recommended programs.

6. The terminal apparatus according to claim 2, wherein
the record-scheduling-state acquiring section acquires data of record scheduling states of a plurality of the recording apparatuses through the network, and
the record-scheduling-state-display processing section creates EPG display data that reflects a record scheduling state for each of the recording apparatuses selected by a user.

7. The terminal apparatus according to claim 2, wherein
the record-scheduling-state acquiring section acquires data of record scheduling states of a plurality of the recording apparatuses through the network, and
the record-scheduling-state-display processing section creates EPG display data in which the acquired record scheduling states of the recording apparatuses are combined and reflected on the EPG data.

8. The terminal apparatus according to claim 2, wherein the record-scheduling-state acquiring section requests acquisition of the data of the record scheduling state through the network and acquires the data of the record scheduling state as a response to the request.

9. The terminal apparatus according to claim 2, further comprising a remote-record-scheduling processing section that transmits a record scheduling request for a program selected by a user on an EPG that is displayed on the display unit and reflects the record scheduling state through the network.

10. The terminal apparatus according to claim 9, wherein the remote-record-scheduling processing section transmits a cancellation request for record scheduling for the program selected by the user on the EPG that is displayed on the display unit and reflects the record scheduling state.

11. A method of displaying, in a terminal apparatus, a record scheduling state of a recording apparatus, comprising:
   acquiring data of a record scheduling state of the recording apparatus through a network, the data of the record scheduling state including information regarding one or more programs to be recorded by the recording apparatus and information regarding one or more recommended programs recommended to be recorded by a user;
   acquiring Electronic Program Guide (EPG) data;
   creating, based on the data of the record scheduling state and the EPG data, EPG display data that reflects the record scheduling state, the EPG display data including one or more first graphic symbols indicating that the corresponding one or more programs are to be recorded by the recording apparatus and one or more second graphic symbols, different from the first graphic symbols, indicating the corresponding one or more recommended programs; and
   displaying the EPG display data.

12. A non-transitory computer-readable storage medium storing a computer program that when executed by a computer, causes the computer to execute a method comprising:
   acquiring data of a record scheduling state of a recording apparatus through a network, the data of the record scheduling state including information regarding one or more programs to be recorded by the recording apparatus and information regarding one or more recommended programs recommended to be recorded by a user;
   acquiring Electronic Program Guide (EPG) data;
   creating, based on the data of the record scheduling state and the EPG data, EPG display data that reflects the record scheduling state, the EPG display data including one or more first graphic symbols indicating that the corresponding one or more programs are to be recorded by the recording apparatus and one or more second graphic symbols, different from the first graphic symbols, indicating the corresponding one or more recommended programs; and
   displaying the EPG display data.

* * * * *